United States Patent [19]
Asayama et al.

[11] Patent Number: 5,209,141
[45] Date of Patent: May 11, 1993

[54] APPARATUS FOR CONTROLLING GEAR BOX

[75] Inventors: Yoshio Asayama, Chigasaki; Makio Tsubota, Hiratsuka; Yasunori Okura, Hiratsuka; Takayuki Sato, Hiratsuka, all of Japan

[73] Assignee: Kabushiki Kaisha Komatsu Seisakusho, Japan

[21] Appl. No.: 842,061

[22] Filed: Feb. 26, 1992

Related U.S. Application Data

[62] Division of Ser. No. 449,926, Dec. 20, 1989, Pat. No. 5,113,720.

[30] Foreign Application Priority Data

Jun. 24, 1987 [JP] Japan .................. 62-157088
Aug. 7, 1987 [JP] Japan .................. 62-197711

[51] Int. Cl.$^5$ .......................................... F16H 61/06
[52] U.S. Cl. ............................. 74/866; 364/424.1
[58] Field of Search ................... 74/866; 364/424.1

[56] References Cited

U.S. PATENT DOCUMENTS

| | | | |
|---|---|---|---|
| 4,653,350 | 3/1987 | Downs et al. | 74/866 X |
| 4,685,356 | 8/1987 | Iwatsuki | 74/866 |
| 4,799,158 | 1/1989 | Patil | 364/424.1 |
| 4,800,497 | 1/1989 | Koori et al. | 74/866 X |
| 4,803,901 | 2/1989 | Hamano et al. | 74/866 X |
| 4,807,496 | 2/1989 | Hayasaki et al. | 74/866 |
| 4,821,190 | 4/1989 | Patil | 364/424.1 |
| 5,092,199 | 3/1992 | Goto et al. | 364/424.1 X |
| 5,113,720 | 5/1992 | Asayama et al. | 74/866 |

*Primary Examiner*—Dirk Wright
*Attorney, Agent, or Firm*—Welsh & Katz

[57] ABSTRACT

During shift change, a discrimination is made as to a load, a quantity of residual hydraulic oil in respective shift change clutches (F, R, 1 to 4) and a state of shift change which has been effected from what speed stage to what speed stage so that a pattern of electrical commands to be issued to pressure control valves (51 to 56) for required shift change clutches is variably controlled depending on results derived from the above discrimination. Thus, smooth shift change can always be achieved regardless of running conditions. Electrical commands ($C_1$ to $C_6$) to be fed to the respective pressure control valves (51 to 56) are compared with electrical currents ($I_1$ to $I_6$) outputted from drive circuits and outputs ($S_1$ to $S_6$) from clutch pressure detecting means (101 to 106) for each clutch, whereby an abnormality is detected with the relevant clutch based on results derived from the comparison. Once an abnormality is detected, an adequate disposal for processing the abnormality is executed so as to reliably prevent double engagement from taking place with clutches.

10 Claims, 20 Drawing Sheets

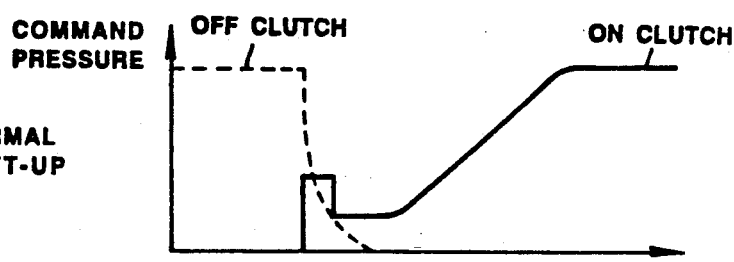
FIG.7(a) NORMAL SHIFT-UP
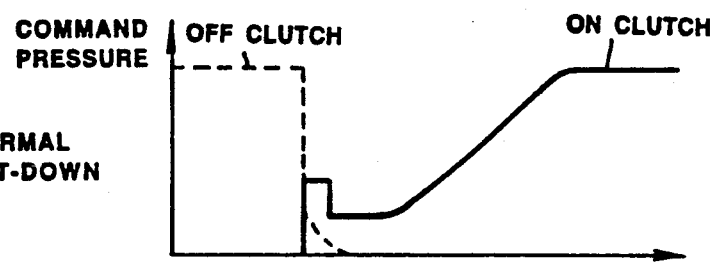
FIG.7(b) NORMAL SHIFT-DOWN
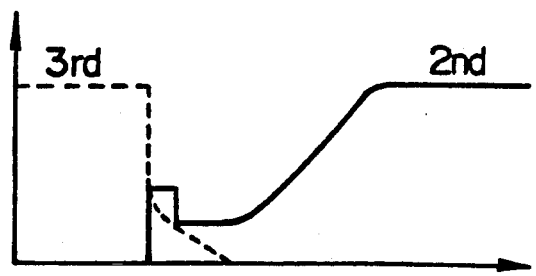
FIG.7(c) F3→F2 POWER PATTERN

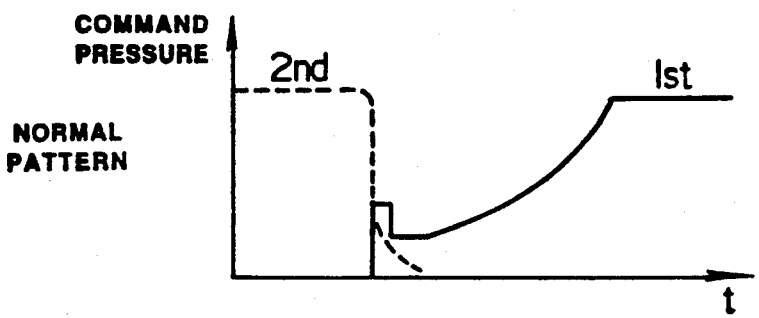
FIG. 8(a) NORMAL PATTERN
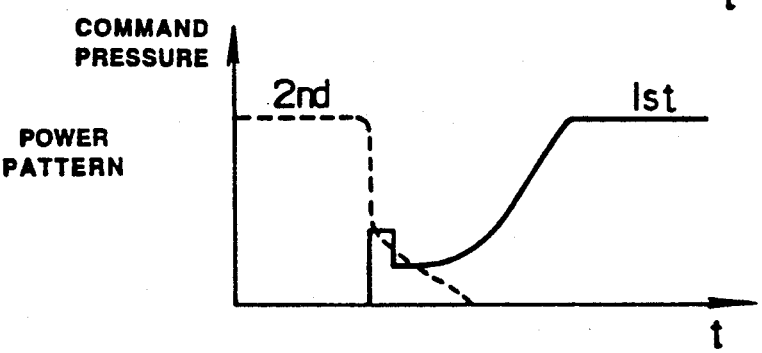
FIG. 8(b) POWER PATTERN
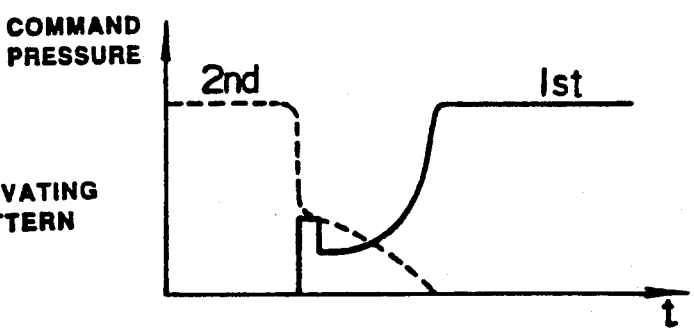
FIG. 8(c) EXCAVATING PATTERN
F2→F1

APPARATUS FOR CONTROLLING GEAR BOX

This is a division of application Ser. No. 449,926, filed Dec. 20, 1989, now U.S. Pat. No. 5,113,720.

TECHNICAL FIELD

The present invention relates generally to an apparatus for controlling a clutch pressure for a gear box usable for a construction machine or the like vehicle separately connected to a plurality of pressure control valves adapted to be actuated in response to an electrical command issued to a plurality of shift change clutches. More particularly, it relates to a manner of providing a pattern indicative of a command hydraulic pressure to always realize smooth shift change under various condition of running as well as a structure required for preventing double engagement from taking place with clutches.

BACKGROUND ART

A filling time, an initial pressure for clutch engagement and a gradient of build-up hydraulic pressure can be noted as evaluation parameters employable for a gear box. The filling time represents a period of time that elapses until an empty clutch pack is fully filled with hydraulic oil. Since no torque is transmitted for the period of filling time, it is desirable that the filling time is shortened as far as possible. If a clutch pressure is elevated to a high level when a clutch starts to be brought in an engaged state, shock caused by shift change may be amplified. Accordingly, it is desirous that the initial pressure usable for clutch engagement is reduced as far as possible. Since a property of acceleration and a riding comfort vary depending on a gradient of build-up hydraulic pressure after completion of the filling, it is necessary that the gradient is adequately determined depending on a variety of running conditions.

With a conventional gear box used for a construction machine, however, a mechanical type modulation valve is employed while utilizing a spring force. This modulation valve has a function of gradually increasing a hydraulic pressure active on a clutch in a purely mechanical manner when the clutch is brought in an engaged state, and this function causes the clutch pressure to be increased with a predetermined gradient.

However, a pattern indicative of a hydraulic pressure derived from this modulation valve is determined uniformly due to the structure specific to the modulation valve. Thus, with the conventional apparatus, the hydraulic pressure pattern is set to such an intermediate value that requirements for the above-described properties can satisfactorily be met to some extent.

However, the respective clutch properties as described above vary largely during shift change under various conditions such as a loading state, a time interval of shift change (representative of a period of time from the time when a clutch is turned off till the time when it is later turned on) and a speed stage at which the shift change has been effected. For the reason, as long as an uniform hydraulic pressure pattern is always provided like the conventional apparatus, there arises a problem that adequate shift change can not be achieved any more. If a command pressure pattern to be given is not correctly determined at the time of shift change, e.g., at the time of running of the vehicle on a slope under a large magnitude of load, at the time of an excavating operation or the like, a malfunction such as breathing or plunge-back (representative of a state that the vehicle moves back after it plunges into a mass of excavated gravel) occurs.

With respect to a problem of double engagement, a conventional transmission control system employs such a structure that a plurality of shift valves adapted to perform ON/OFF shifting for each clutch are connected in series to respective clutches so that when one clutch is brought in an engaged state, other clutch is released from the engaged state without fail so as to prevent double engagement from taking place with the clutches.

In recent years, a proposal has been made as to a shift change system wherein a plurality of (proportional) pressure control valves adapted to be actuated in response to an electrical command are connected to a plurality of shift change clutches in a parallel relationship. With this system, however, it is difficult that the respective pressure control valves are mechanically connected in series to the corresponding shift change clutches in a conventional manner so as to prevent double engagement from taking place with the clutches. Since it has been found that double engagement takes place with the clutches because of the presence of a drive circuit by way of which an electrical command is inputted into the pressure control valve or due to mechanical trouble with the clutch housing, it has been heretofore requested that a suitable process for preventing double engagement from taking place with the clutches is developed for the shift change system.

The present invention has been made with the foregoing background in mind and its object resides in providing an apparatus for controlling a gear box which assures that smooth shift change unit can always be achieved under various conditions of running of a vehicle.

Other object of the present invention is to provide an apparatus for controlling a gear box which assures that a shift change system in which each shift change clutch is individually controlled by an electronic type pressure control valve can reliably prevent double engagement from taking place with clutches.

DISCLOSURE OF THE INVENTION

To accomplish the above objects, there is provided according to one aspect of the present invention an apparatus for controlling a gear box, wherein the apparatus comprises vehicle speed detecting means for detecting a vehicle speed, throttle opening extent detecting means for detecting the extent of opening a throttle, shift change time interval measuring means for measuring a period of time as measured from the time when a clutch is turned off till the time when it is later turned on, a shift change stage discriminating means for discriminating that shift change is effected from what speed stage to what speed stage during the shift change and controlling means for variably controlling a pattern of electrical command adapted to vary as time elapses depending on outputs from the vehicle speed detecting means, the throttle opening extent detecting means, the shift change time interval measuring means and the shift change stage discriminating means. The current loading state (representing that a vehicle runs on a slope or it performs an excavating operation or it runs on a flat ground) is determined depending on the vehicle speed and the extent of opening of a throttle. Further, a quantity of residual oil in each clutch is determined depending on the time interval of shift change change and the vehicle speed. The shift change stage discriminating means determines that speed changing is correctly effected from what speed changing stage to what speed changing stage. Then, a pattern indicative of command pressure to be issued to a required clutch is varied based on results derived from the foregoing determinations.

In this manner, with the apparatus of the present invention, the load, the manner of shift change and the operative state of each clutch are determined based on the vehicle speed, the extent of opening of the throttle, the time interval of shift change and the shift change stage, whereby the command pressure pattern to be issued to a required clutch is variably controlled depending on results derived from the foregoing determinations. Thus, malfunctions such as breathing at the time of running of the vehicle on a slope and plungeback of the vehicle during excavating operation can be minimized. Consequently, stable filling can be achieved and smooth speed changing can always be accomplished.

Further, there is provided according to other aspect of the present invention an apparatus for controlling a gear box including a plurality of shift change clutch, a plurality of pressure control valves separately connected to the shift change clutches to individually control hydraulic pressure in the shift change clutches and a plurality of drive circuits in which electric currents is applied to the pressure control valves in response to inputted clutch hydraulic pressure commands, wherein pressure controlling means for detecting clutch pressure in each clutch is provided for each clutch and clutch hydraulic pressure command inputted in the drive circuits is compared with an output from the pressure detecting means for each clutch so as to detect an abnormality with each clutch based on results derived from the foregoing comparison.

With the apparatus of the present invention, the clutch hydraulic command is compared with electric current outputted from the drive circuit for each clutch so as to detect an abnormality with each drive circuit based on results derived from the foregoing comparison.

Since a predetermined corresponding relationship is established between the clutch hydraulic pressure command and an output from the pressure detecting means or electric current outputted from the drive circuits, an abnormality is detected when non-coincidence occurs among signals derived from the foregoing corresponding relationship.

Further, there is provided according to another aspect of the present invention an apparatus for controlling a gear box including a plurality of clutches each adapted to be individually controlled by an electrohydraulic control valve provided for each clutch, wherein a clutch hydraulic pressure command signal is compared with a drive electric current for the electrohydraulic control valve or the detected clutch pressure for each clutch so as to detect an abnormality based on results derived from the foregoing comparison for each clutch. Consequently, the apparatus of the present invention can reliably prevent double engagement from taking place with clutches with the result that damage or injury of associated components and units attributable to the above-described double engagement can be prevented without fail.

BRIEF DESCRIPTION OF THE DRAWINGS

FIGS. 7(a), 7(b), 7(c), 8(a), 8(b) and 8(c) show a plurality of time charts each exemplifying various manners of variably controlling the command pressure pattern.

BEST MODE FOR CARRYING OUT THE INVENTION

Now, the present invention will be described in detail hereinafter with reference to the accompanying drawings which illustrate preferred embodiments thereof.

Figure 1:
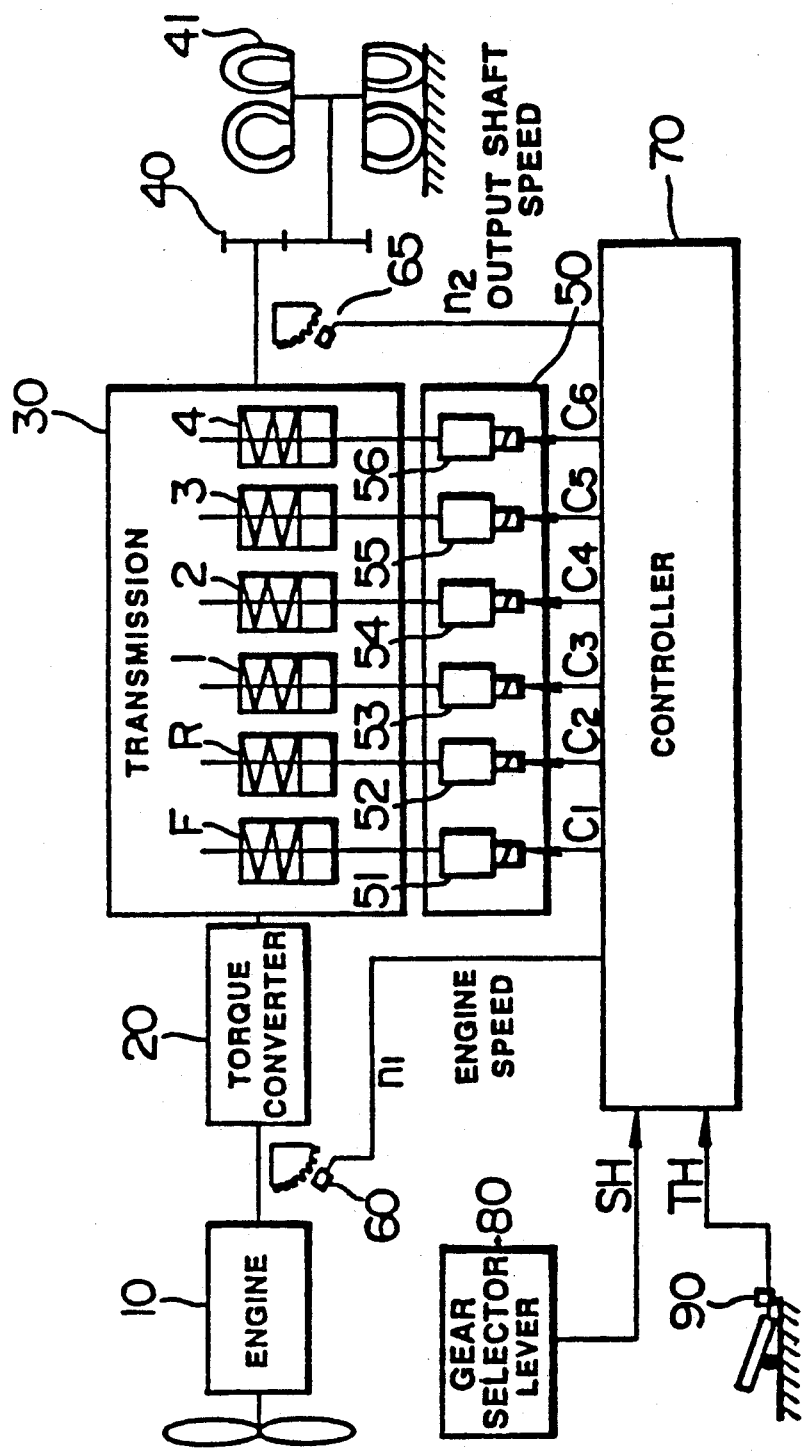
FIG. 1 is a block diagram which schematically illustrate an apparatus for controlling a gear box in accordance with an embodiment of a first invention.

FIG. 1 is a block diagram which schematically illustrates a controlling system in accordance with an embodiment of a first invention.

The system shown in FIG. 1 is constructed on the assumption that it is employed for a wheel loader. The output from an engine 10 is transmitted to a transmission 30 via a torque converter 20 and then it is transmitted further to driving wheels 41 via a differential gear and a final speed reduction unit 40.

Figure 2:
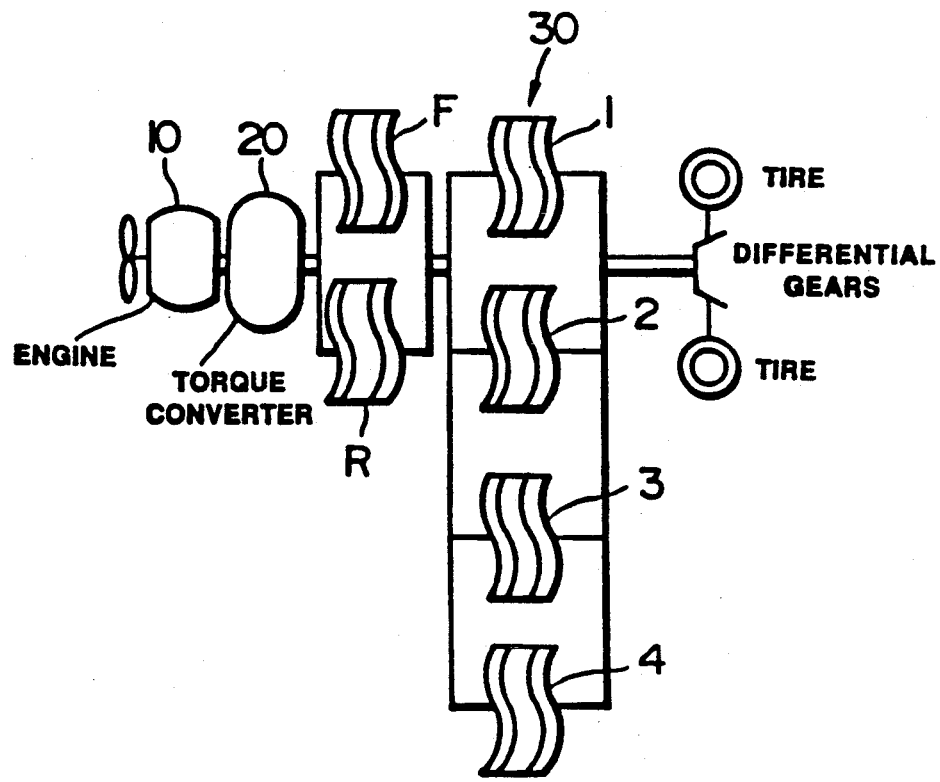
FIG. 2 is an explanatory view which schematically illustrates the inner structure of a transmission.

As shown in FIG. 2, the transmission 30 includes a clutch F (forward movement) and a clutch R (rearward movement) belonging to a first stage to be selectively connected to an output shaft of the torque converter 20 as well as a speed clutch 1 (1st speed), a speed clutch 2 (2nd speed), a speed clutch 3 (3rd speed) and a speed clutch 4 (4th speed) belonging to a second stage and arranged on the output shaft side of the transmission 30, whereby one of speed stages (F1, F2, F3, F4, R1, R2, R3 and R4) is selected by correct combination among the forward and rearward clutches F and R at the first stage and the speed clutches 1, 2, 3 and 4 at the second speed stage.

These clutches usable for the purpose of shift change are supplied with hydraulic oil delivered from a hydraulic oil supplying unit 50. Specifically, the hydraulic oil supplying unit 50 includes a plurality of pressure control valves 51 to 56 hydraulically connected to the corresponding speed changing clutches which are individually controlled by the pressure control valves 51 to 56. The pressure control valves 51 to 56 include corresponding proportional solenoids each serving as an actuator for displacing a spool so as to generate hydraulic pressure in proportion to electrical command signals $C_1$ to $C_6$ to be inputted into the corresponding proportional solenoids. Accordingly, an arbitrary hydraulic pressure pattern can be given to each clutch by properly controlling the command signals $C_1$ to $C_6$ to be outputted from a controller 70.

The output shaft of the engine 10 is equipped with a rotation sensor 60 and the output shaft of the transmission 30 is equipped with another rotation sensor 65 so as to detect the number of revolutions of the respective output shafts. Outputs $n_1$ and $n_2$ from the rotation sensors 60 and 65 are inputted into the controller 70. In addition to the outputs $n_1$ and $n_2$, a lever position signal SH indicative of the current position assumed by a shift lever 80 and an output TH from a throttle opening extent sensor 90 for detecting a quantity of depression of an acceleration pedal are inputted into the controller 70.

The controller 70 senses the current vehicle speed V based on an output from the rotation sensor 65 installed on the output shaft of the transmission 30 and makes a determination depending on the vehicle speed V and the throttle opening extent signal TH as to whether the vehicle remains in a loading state, i.e., it runs on a flat ground (under a small magnitude of load) or it runs on an uphill land (under an intermediate magnitude of load) or it performs an excavating operation (under a large magnitude of load). Further, the controller 70 makes a determination as to a time interval of shift change (which will be described later) with the aid of a timer circuit incorporated therein. Additionally, the controller 70 makes a determination as to the current stage of shift change (representing that shift change has been effected from what speed stage to what speed stage) in response to the lever position signal SH. Thus, a command pressure pattern to be given to the respective pressure control valves 51 to 56 can adequately be varied depending on results derived the foregoing determinations. Next, detailed description will be made hereinafter as to variable controlling for the command pressure pattern.

Basically, the controller 70 gives command voltages each indicative of a pattern as represented by solid lines and dotted lines in FIG. 3 to a clutch to be turned on (hereinafter referred to as ON clutch) and a clutch to be turned off (hereinafter referred to as OFF clutch) during shift change. In detail, the controller 70 operates such that with respect to the OFF clutch (represented by dotted lines), the command voltage is transiently lowered to a level of zero at the time of starting the shift change, with respect to the ON clutch, the command voltage is elevated to a high level (representative of a trigger part) for an initial period of time during a filling time $t_f$ so as to allow a large quantity of hydraulic oil to be introduced into the clutch at a high flow rate with an increased hydraulic pressure and, just before completion of the filling, the command voltage is lowered to a low level so as to allow the initial hydraulic pressure to be reduced when the clutch is brought in an engaged state. After completion of the filling, the command voltage is gradually increased to build up hydraulic pressure. In this manner, crossover control is carried out such that the hydraulic pressure pattern to be given to the ON clutch partially overlapps the hydraulic pressure pattern to be given to the OFF clutch during the controlling operation for shift change.

Figure 3:
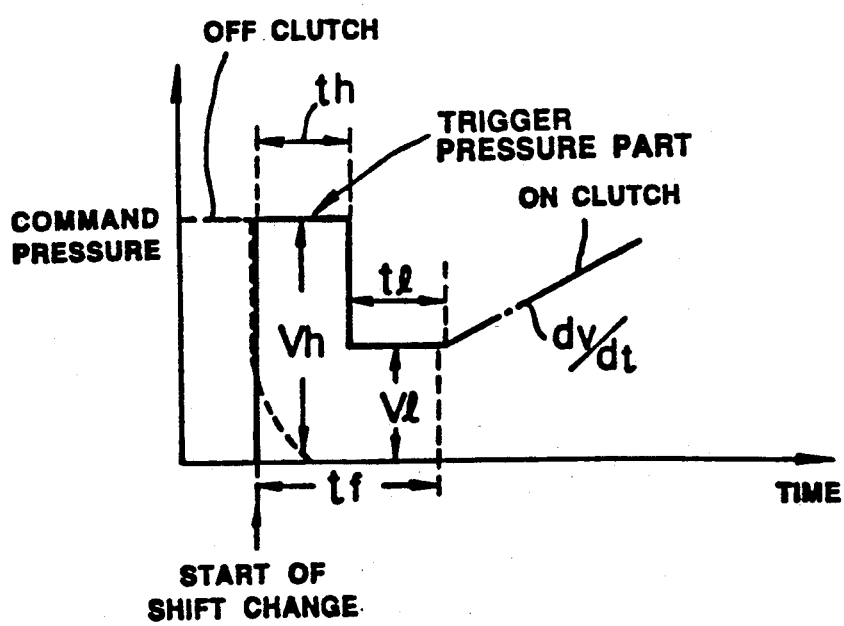
FIG. 3 is a time chart which, illustrates a pattern indicative of command pressure.

The time chart shown in FIG. 3 represents a basic hydraulic pressure pattern, and the controller 70 varies a voltage level $V_h$ of the trigger command part (representative of the high pressure part) in the hydraulic pressure pattern on the ON clutch side, a level holding time $t_h$ for the voltage level $V_h$, a voltage level $V_l$ in a low pressure level part and a level holding time $t_l$ for the voltage level $V_l$ (which may be reduced to a level of zero), a gradient $dV/dt$ of the hydraulic pressure gradual increasing part and a manner of reducing the voltage corresponding to the hydraulic pressure pattern of the OFF clutch depending on four parameters to be described in more detail later (shift change stage, vehicle speed, extent of opening of the throttle and time interval of shift change) (see FIG. 3). In detail, various kinds of hydraulic pressure patterns each having these parts varied adequately are prepared so that these many hydraulic pressure patterns are previously stored in a memory of the controller 70. Thus, variable controlling can be effected for a command pressure pattern by selecting and reading an adequate hydraulic pattern with reference to a value which can be assumed by each of the foregoing parameters.

Figure 4A:
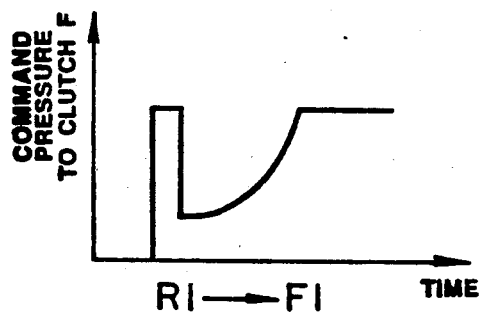
FIGS. 4(a) and 4(b) show time charts each illustrating by way of example a manner of variably controlling the command pressure pattern.
Figure 4B:
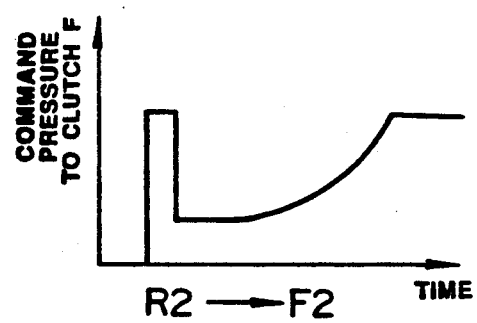

Firstly, the first parameter is "a shift change stage", and the command pressure pattern is varied depending on the current shift change which has been effected from what speed stage to what speed stage. Due to the fact that each clutch has a clutch pack of which capacity differs from clutch to clutch, $V_h$, $t_h$, $V_l$, $t_l$ and $dV/dt$ each belonging to the command pressure pattern are varied depending on difference among the clutch themselves (see FIG. 3). When shift change is effected from forward movement to rearward movement and vice versa such as from R1 to F1, R2 to F2 or the like, the forward movement clutch F or the rearward movement clutch R are shifted from ON to OFF or from OFF to ON while the ON state of the speed clutch 1 or 2 is maintained as it is left unchanged. According to the present invention, when shift change is effected from F to R and vice versa in that way, a command pressure pattern to be given to the forward movement clutch F is varied in a different manner as shown in FIGS. 4(a) and 4(b) at the time of shift change from R1 to F1 as well as at the time of shift change from R2 to F2. When shift change is effected from F to R and vice versa, it is natural that running energy and a property of acceleration owned by the vehicle body differ from speed clutch to speed clutch. Consequently, energy to be absorbed by each speed clutch varies Since variation of speed (acceleration) of the vehicle is normally small at the time of shift change from R1 to F1, an operator does not feel unpleasant for a short period of time even when hydraulic pressure is increased, as shown in FIG. 4(a). However, since variation of speed of the vehicle is normally large at the time of shift change from R2 to F2, an operator feels speed increase in a doubled scale, if shift change is effected with the same hydraulic pressure pattern as at the time of speed changing from R1 to F1. For the reason, at the shift change from R2 to F2, hydraulic pressure is gradually increased with a gentle gradient as shown in FIG. 4(b).

Such build-up variable controlling is effected not only for a property of riding comfort but also for reducing the effect attributable to a thermal load generated in the gear box. Specifically, since each clutch is brought in an engaged state accompanied by slippage at the time of shift change, absorbed energy is transformed into heat. However, an excessively large quantity of heat causes the clutch to be damaged.

Since the above-described behavior appears in the same manner not only at the time of shifting from R to F and vice versa but also at the time of shifting of the speed clutch from F4 to F3, F3 to F2 or the like, the command pressure pattern is varied every time when speed changing is effected in that way.

Figure 5:
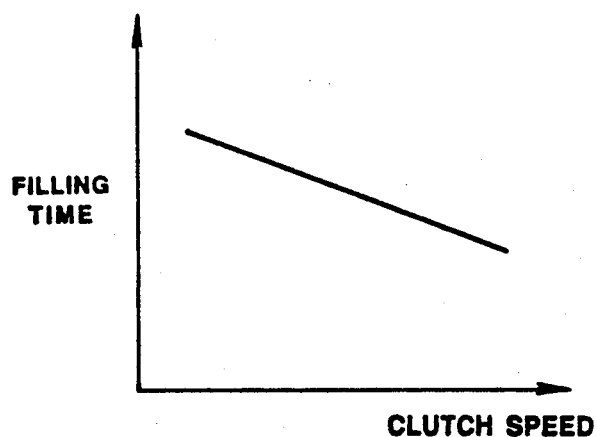
FIG. 5 is a graph illustrating a relationship between the filling time and the number of revolutions of a clutch.

Next, the second parameter is "a vehicle speed". A vehicle with which the filling time fluctuates depending on the vehicle speed is of type that the clutch itself rotates as the shaft rotates. With this type of vehicle, the clutch rotates as the vehicle runs with the result that hydraulic pressure is generated in the interior of the clutch pack due to centrifugal force. The thus generated hydraulic pressure attributable to the centrifugal force allow hydraulic oil to enter into the clutch pack with easiness. Accordingly, a cyclical relationship as represented by an order of increasing of vehicle speed, increasing of the number of revolutions of a clutch, increasing of hydraulic pressure attributable to centrifugal force and shortening of the filling time is established. FIG. 5 is a graph which schematically illustrates a relationship between the clutch speed and the filling time based on results derived from a number of experiments. As is apparent from the graph, the larger the clutch speed, the shorter the filling time.

Next, the third parameter is "an extent of opening of the throttle". An output TH from a throttle quantity sensor 90 is inputted into the controller 70 so that the controller 70 determines the current loading state of the vehicle depending on the output TH from the throttle quantity sensor 90 and the value V of vehicle speed. Namely, the controller 70 makes a determination based on the extent of opening of the throttle and the vehicle speed as to what state is currently assumed by the vehicle among three operative states, i.e., (1) running of the vehicle on a slope, (2) running of the vehicle on the flat ground and (3) excavating operation performed by the vehicle. Then, the controller 70 issues a command pressure pattern corresponding to results derived from the foregoing determination.

Figure 6A:
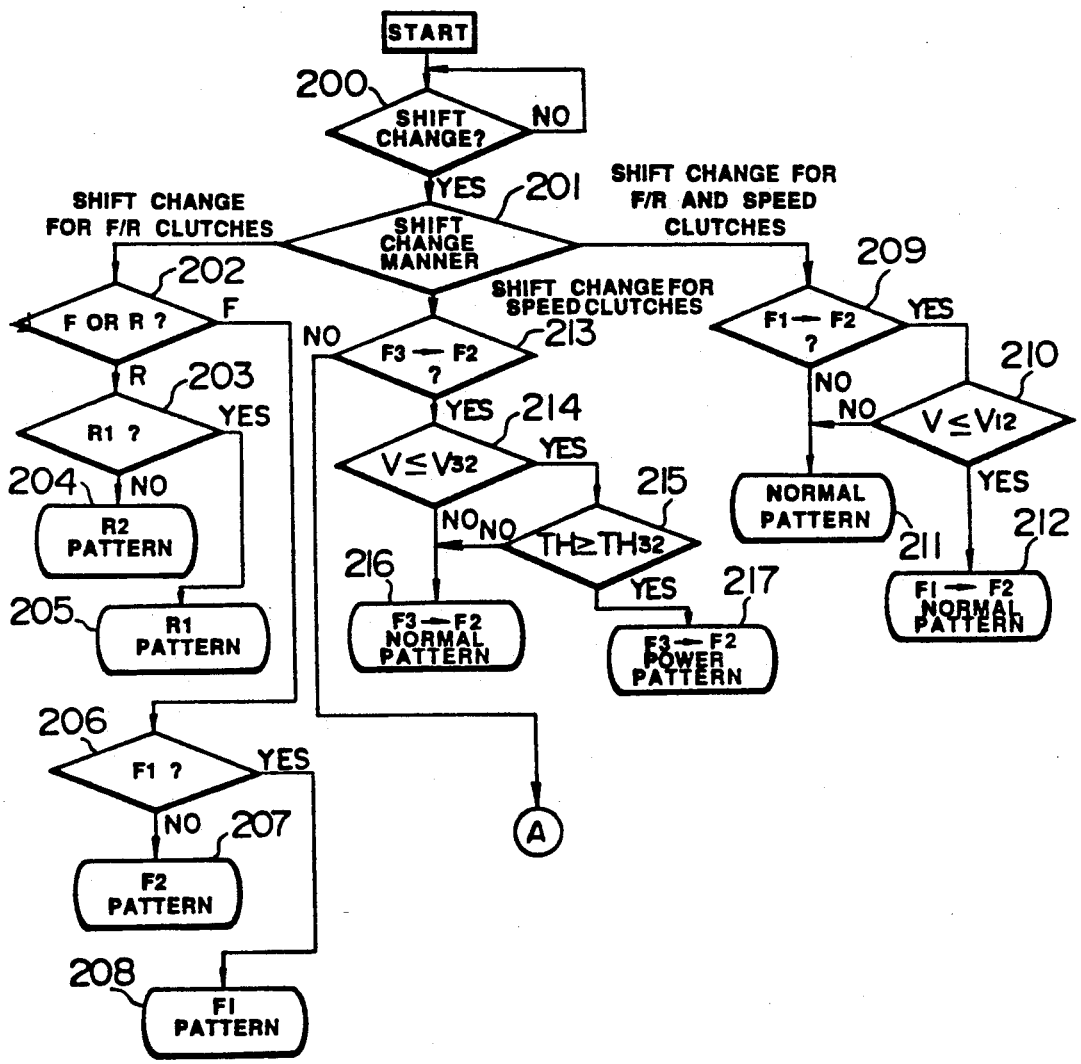
FIGS. 6(a) and 6(b) are flowcharts illustrating by of example variable control for the command pressure pattern with the use of a controller employed for the apparatus of the present invention.
Figure 6B:
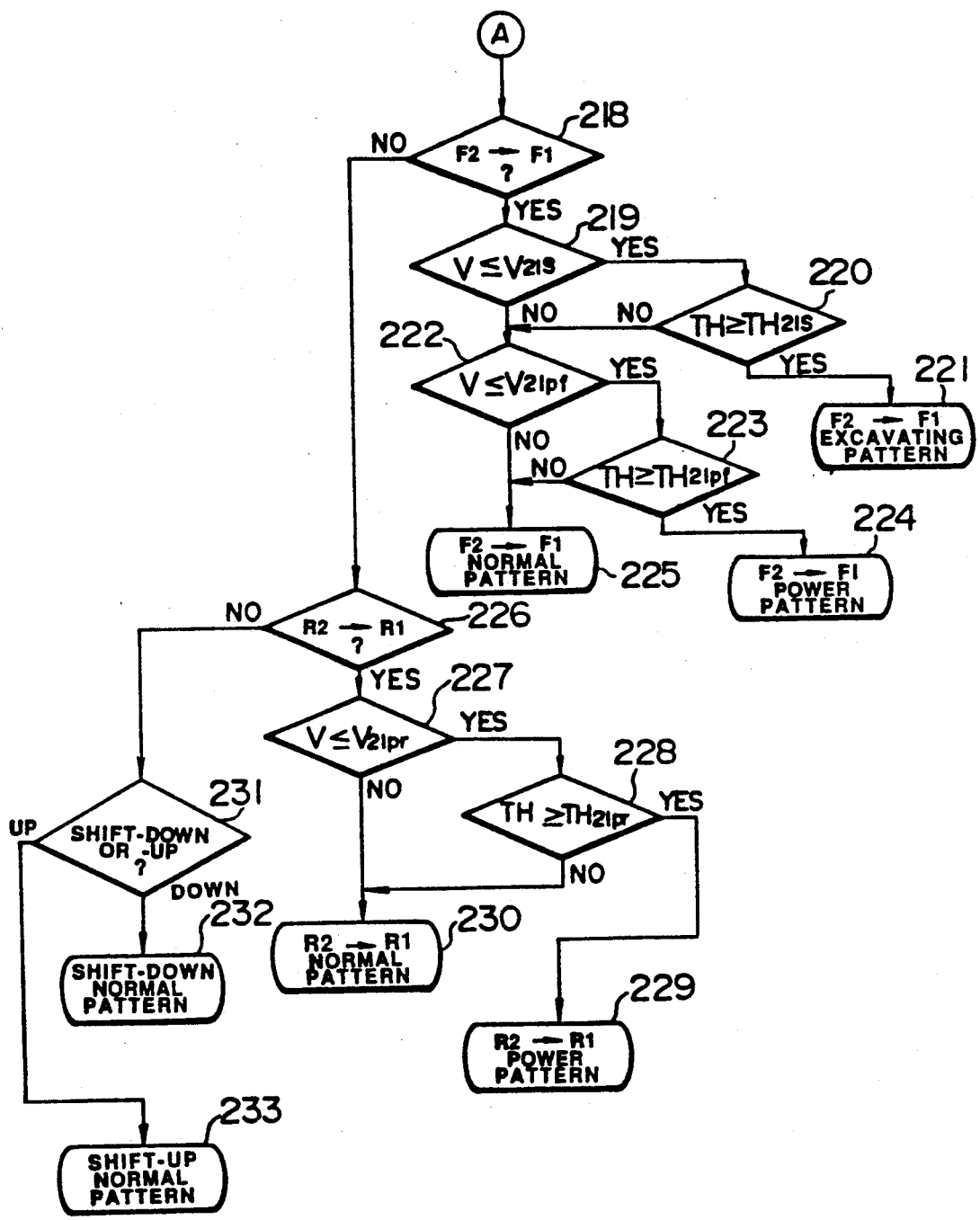

FIGS. 6(a) and 6(b) are a flowchart which illustrates by way of example variable controlling for the pattern indicative of a command to be issued from the controller 70 based on the above-described three parameters.

When the controller 70 senses the current shift change (step 200), it makes a discrimination as to what shift change is currently effected among three types of shift change, i.e., (1) shift change from forward movement to rearward movement and vice versa with the use of forward movement clutch and rearward movement clutch only, (2) shift change with the use of speed clutches only and (3) shift change with the use of both forward movement/rearward movement clutches and speed clutches (step 201).

In the case of shift change from forward movement to rearward movement and vice versa as defined in the item (1), the controller 70 makes a discrimination as to either of the shift change from forward movement to rearward movement and the shift change from rearward movement to forward movement is next performed (step 202). In case where it is found that the shist change from forward movement to rearward movement is practically effected, the controller 70 provides a command pressure pattern indicative of R1 or R2. Namely, in the case of shift change from F1 to R1, the controller 70 gives R1 pattern to the rearward movement clutch R as a command pressure (steps 203 and 205). In the case of shift change from F2 to R2, F3 to R3 and F4 to R4 other than the foregoing shist change from F1 to R1, the controller 70 gives R2 pattern to the rearward movement clutch R (step 204). Further, in the case of shift change from rearward movement to forward movement, the controller 70 gives F1 pattern to the forward movement clutch F in the same manner as mentioned above (steps 206 and 208). In the case of shift change from R2 to F2, R3 to F2 and R3 to F3, the controller 70 gives F2 pattern to the forward movement clutch F (step 207). When forward movement is shifted to rearward movement and vice versa, the speed clutch 1 or 2 is brought in an engaged state in almost cases. In this case, the controller 70 provides a patter common to R2 to R4 or F2 to F4. As required, the controller 70 may allocate a different command pressure pattern to any one of the speed clutches which are different from each other.

Next, when the controller 70 determines the item (3), i.e., shift change with the use of the both forward/rearward movement clutches and speed clutches at the step 201, the controller 70 controls the respective clutches with the use of a pattern indicative of shift change from F1 to R2 (step 212) only in the case of shift change from F1 to R2 (step 209) as well as in the case where the vehicle speed V is equal to or less than $V_{12}$ ($v_{12}$ set value) (step 212). In other case rather than the foregoing ones, however, the controller 70 gives a normal hydraulic pressure pattern to a required clutch.

When the controller 70 determines the item (2), i.e., shift change only with the use of speed clutches, the controller 70 makes a determination as to what speed clutch is used for shist change. In the case of shift change from F3 to F2 (step 213), the controller 70 investigates the vehicle speed V and the throttle opening extent TH (steps 214 and 215). In case where V is more than $V_{32}$ (set value) or in case where V is equal to or less than $V_{32}$ and TH is less than $TH_{32}$ (set value), the controller 70 controls hydraulic pressure for the speed clutch 3 or 2 with the use of a power pattern representative of shift change from F3 to F2 (step 216). In case where V is equal to $V_{32}$ or less than $V_{32}$ and TH is equal to or more than $TH_{32}$, the controller 70 controls hydraulic pressure for the speed clutch 3 or 2 with the use of a power pattern representative $F_3$ to $F_2$ (step 217). FIG. 7(b) is a time chart which schematically illustrates a hydraulic pressure pattern at the time of normal shift-down that is a basis shape of normal pattern representative of shift change from F3 to F2. Similarly, FIG. 7(c) is a time chart which schematically illustrates a power pattern representative of shift change from F3 to F2. With respect to the both patterns as described above, hydraulic pressure in the OFF clutch is elevated and lowered in a different manner.

Next, in the case of shift change from F2 to F1 (step 218), the controller 70 investigates the vehicle speed V and the throttle opening extent TH (steps 219, 220, 222 and 223). When it is found that V is equal to or less than $V_{21s}$ and TH is equal to or more than $TH_{21s}$, the controller 70 controls hydraulic pressure for the speed clutches 2 and 1 with the use of an excavating pattern representative of shift change from F2 to F1 (step 221). When it is found that V is equal to less than $V_{21pf}$ and TH is equal to or more than $TH_{21pf}$, the controller 70 controls hydraulic pressure for the speed clutches 2 and 1 with the use of a power pattern representative of shift change from F2 to F1 (step 224). In other case rather than the foregoing ones, the controller 70 controls hydraulic pressure for the speed clutches 2 and 1 with the use of a normal pattern representative of shift change from F2 to F1 (step 225). It should be noted that $V_{21s}$, $V_{21pf}$, $TH_{21s}$ and $TH_{21pf}$ are a preset value, respectively, and they provide a relationship representing that $V_{21pf}$ is more than $V_{21s}$ as well as a relationship representing that $TH_{21s}$ is more than $TH_{21pf}$. FIGS. 8(a), 8(b) and 8(c) show a plurality of time charts which schematically illustrate command pressure patterns in connection with speed changing from F2 to F1. As will be apparent from these time charts, hydraulic pressure in the OFF clutches is elevated and lowered in a different manner and a build-up rate for the ON clutches is adjustably varied.

At the time of shift change from R2 to R1 (step 226), the controller 70 investigates the vehicle speed and the throttle opening extent in the same manner as mentioned above (steps 227 and 228). When it is found that V is equal to or less than $V_{21pr}$ (set value) and TH is equal to or more than $TH_{21pr}$ (set value), the controller 70 controls hydraulic pressure for the speed clutches 2 and 1 with the use of a power pattern representative of shift change from R2 to R1 (step 229). In other case rather than the foregoing one, the controller 70 controls hydraulic pressure for the speed clutches 2 and 1 with the use of a normal pattern representative of shift change from R2 to R1 (step 230). Further, at the time of shift-down other than the foregoing cases (shift change from F4 to F3 or the like), the controller 70 controls hydraulic pressure for a required speed clutch with the use of a normal pattern indicative of shift-down shown in FIG. 7(c) (steps 231 and 232). Additionally, at the time of shift-up shift change, the controller 70 controls hydraulic pressure for a required clutch with the use of a normal pattern indicative of shift-up shown in FIG. 7(a) (step 233).

In this manner as is apparent from the flowchart shown in FIGS. 6(a) and 6(b), the controller 70 adjustably varies a command pressure pattern to be given to a required clutch depending on the above-described three parameters, i.e., "shift change stage", "vehicle speed" and "extent of opening of the throttle".

In addition to the aforementioned parameters, there is "time interval of shift change" as a factor of inducing fluctuation of the filling time.

Figure 9:
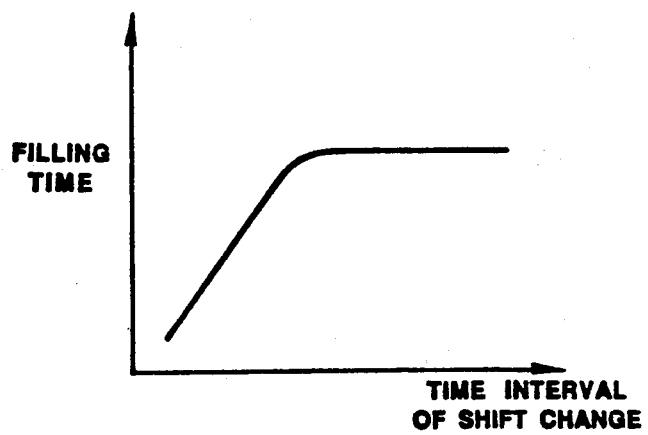
FIG. 9 is a graph illustrating a relationship between the filling time and the time interval of shift change.

Specifically, hydraulic oil in clutch packs and hydraulic pipings can not completely be drained, unless a certain period of time which has been predetermined based on their capacity and others elapses after each clutch is held in a disengaged state. For the reason, if a time interval of shift change as measured from the time when the clutch is held in a disengaged state till the time when it is brought in an engaged state again is short (in case where shift change is effected in an order of the speed clutches 1, 2, 3, 2 and 1, the time interval of shifted change for the speed clutch 1 represents a time required for shift change to be effected in an order of the speed clutches 1, 2, 3, 2 and 1 and the time interval of shift change for the speed clutch 2 represents a time required for shift change to be effected in an order of the speed clutches 2, 3 and 2) is short, this means that on completion of the shift change, the clutch pack for the clutch is not completely emptied but some quantity of hydraulic oil remains therein. In such a case, therefore, the filling time is unavoidably shortened. FIG. 9 is a graph which illustrates a relationship between the time interval of shift change and the filling time. As is apparent from the drawing, as long as the time interval of speed changing is shorter than a predetermined period of time, the filling time largely varies depending on the time interval of shift change.

A quantity of residual hydraulic oil in the clutch pack varies depending on not only the time interval of shift change but also the vehicle speed. For the reason, the controller 70 corrects the width $t_h$ of the trigger part in the command pressure pattern (see FIG. 3) based on the time interval of shift change and the vehicle speed. It should be added that the time interval of shift change is measured with each clutch using a timer incorporated in the controller 70. For example, in response to an output from the timer, the controller 70 temporarily stores the time when each clutch is held in a disengaged state and then measures the time interval of speed changing based on the stored time and an output from the timer when the clutch is brought in an engaged state.

Concretely speaking, the time interval of shift change is classified into, e.g., seven stages as noted below.

(I) 0 to 1 sec., (II) 1 to 3 sec. (III) 3 to 5 sec., (IV) 5 to 10 sec., (V) 10 to 30 sec., (VI) 30 to 60 sec. and (VII) longer than 60 sec.

Further, the vehicle speed is classified into ten stages as noted below.

(I) 0 to 2 km/h, (II) 2 to 4 Km/h, (III) 4 to 6 Km/h, (IV) 6 to 8 Km/h, (V) 8 to 10 Km/h, (VI) 10 to 14 Km/h, (VII) 14 to 18 Km/h, (VIII) 18 to 22 Km/h, (IX) 22 to 26 Km/h and (X) higher than 60 Km/h.

As intermediate data for deriving the trigger value $t_h$, the following values are set.

For example, with respect to the forward movement clutch F operatively associated with the speed clutch 1, the time interval of shift change is set to the following values.

(I) 3, (II) 3, (III) 6, (IV) 7, (V) 8, (VI) 9 and (VII) 10. Further, the vehicle speed is set to the following values.

(I) 10, (II) 10, (III) 10, (IV) 10, (V) 10, (VI) 10, (VII) 10, (VIII) 10, (IX) 10 and (X) 10.

When it is assumed that when shift change is effected in an order of the speed stages F1, R1 and F1, the time interval of shift change is 15 seconds and at this time of shift change the vehicle assumes a vehicle speed of 7 Km/h, the class (V) is selected with respect to the time interval of shift change and the class (IV) is selected with respect to the vehicle speed. As a result, the trigger width $t_h$ is represented by the following equation.

$$\text{trigger width } t_h = 8 \times 10 = 80 \text{ (msec)}$$

These intermediate date are set under such conditions as (1) forward movement at the speed stage F1, (2) forward movement at speed stage F2, F3 and F4, (3) rearward movement at the speed stage R1, (4) rearward movement at the speed stages R2, R3 and R4, (5) operative state of the speed clutch 1, (6) operative state of the speed clutch 2, (7) operative state of the speed clutch 3, (8) operative state of the speed stage 4, (9) operative state of the speed stage 1 at the time of an excavating operation (representative of a stool pattern), (10) operative state of the speed clutch 1 at the time of power-up (running of the vehicle on a slope), (11) operative state of OFF clutch at the time of shift-up and (12) operative state of power-shift during shift change from F3 to F2. Thus, the trigger width at the time of each shift change can adjustably be varied depending on the time interval of shift change and the vehicle speed, whereby a filling operation can be stabilized. Incidentally, with respect to the forward movement clutch F corresponding to the speed clutch 1, the intermediate data on the vehicle speed are kept constant as described above but the intermediate data on the vehicle speed are suitably varied during shift change under other conditions.

In this manner, according to this embodiment of the present invention, since the voltage level $V_h$ of the trigger command part (high pressure part) of a command pressure pattern to be given to ON clutches and OFF clutches, its level holding time $t_h$, the voltage level $V_l$ of the low pressure part, its level holding time $t_l$, the gradient $dV/dt$ of the gradual increasing part and the voltage reduction manner of a hydraulic pressure pattern (for OFF clutch) are adjustably varied depending on the vehicle speed, the extent of opening of the throttle, the time interval of speed changing and the shift change stage, smooth shift change can always be effected regardless of the loading state, the clutch state (residual quantity of hydraulic oil) and the shift change stage.

Incidentally, in addition to the above-described four parameters, there is existent "the number of revolutions of the engine". Accordingly, the command pressure pattern may adjustably be varied depending on the engine speed. This is because of the fact that since a quantity of hydraulic oil delivered from the hydraulic pump varies as the engine speed varies, the filling time varies depending on the engine speed.

In addition, an operator may arbitrarily select various kinds of hydraulic patterns as mentioned above by shifting an actuating switch. For example, with respect to the hydraulic pressure build-up rate, the apparatus may be provided with a plurality of build-up rates such as build-up rate for steep slope, build-up rate for slope having an intermediate gradient, build-up rate for gentle slope or the like. This makes it possible to carry out shift change in accordance with an operator's choice under such a condition that the foregoing build-up rate can be selected by a switch to be actuated by him.

Next, description will be made as to arrangement for preventing double engagement with clutches.

Figure 10:
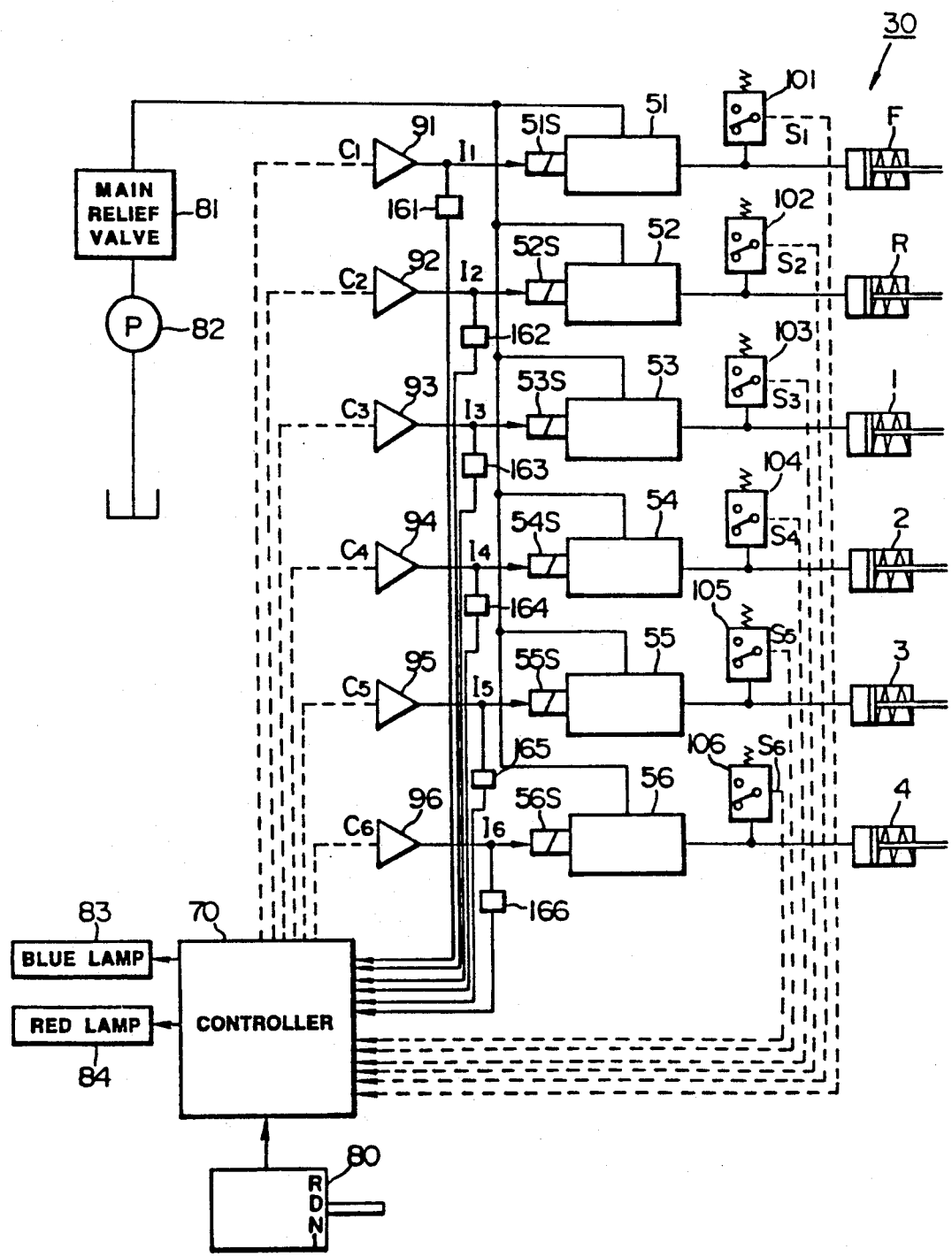
FIG. 10 is a block diagram schematically illustrating by way of example the structure of an apparatus for controlling a gear box in accordance with a second invention.

FIG. 10 is a block diagram which schematically illustrates arrangement of a speed changing unit for the purpose of preventing double engagement. Referring to FIG. 10, a transmission 30 includes six shift change clutches F, R, 1, 2, 3 and 4 in the same manner as described above.

The respective shift change clutches are separately connected to a plurality of pressure control valves 51 to 56 each adapted to be actuated in response to an electrical command in the same manner as described above, whereby hydraulic pressure of each clutch is independently controlled by one of the pressure control valves 51 to 56 connected to the respective clutches. The pressure control valves 51 to 56 include a plurality of corresponding proportional solenoids 51S to 56S each serving as an actuator for displacing a spool so as to generate hydraulic pressure in proportion to a driving current I to be inputted into each solenoid. Each of the pressure control valves 51 to 56 is supplied with hydraulic oil delivered from a hydraulic pump 82 via a main relief valve 81.

Command signals are inputted into the proportional solenoids of the pressure control valves 51 to 56 via a plurality of drive circuits 91 to 96. Specifically, clutch pressure command signals C ($C_1$ to $C_6$) outputted from the controller 70 are amplified in the drive circuits 91 to 96 and thereafter they are inputted into the pressure control valves 51 to 56. Incidentally, the clutch pressure command signals C and the driving current I flowing through each proportional solenoid are held in a proportional relationship relative to each other. Driving currents $I_1$ to $I_6$ flowing through the respective solenoids 51S to 56S are detected by a plurality of electric current detectors 161 to 166, and detection signals $I_1$ to $I_6$ are inputted into the controller 70.

Figure 11:
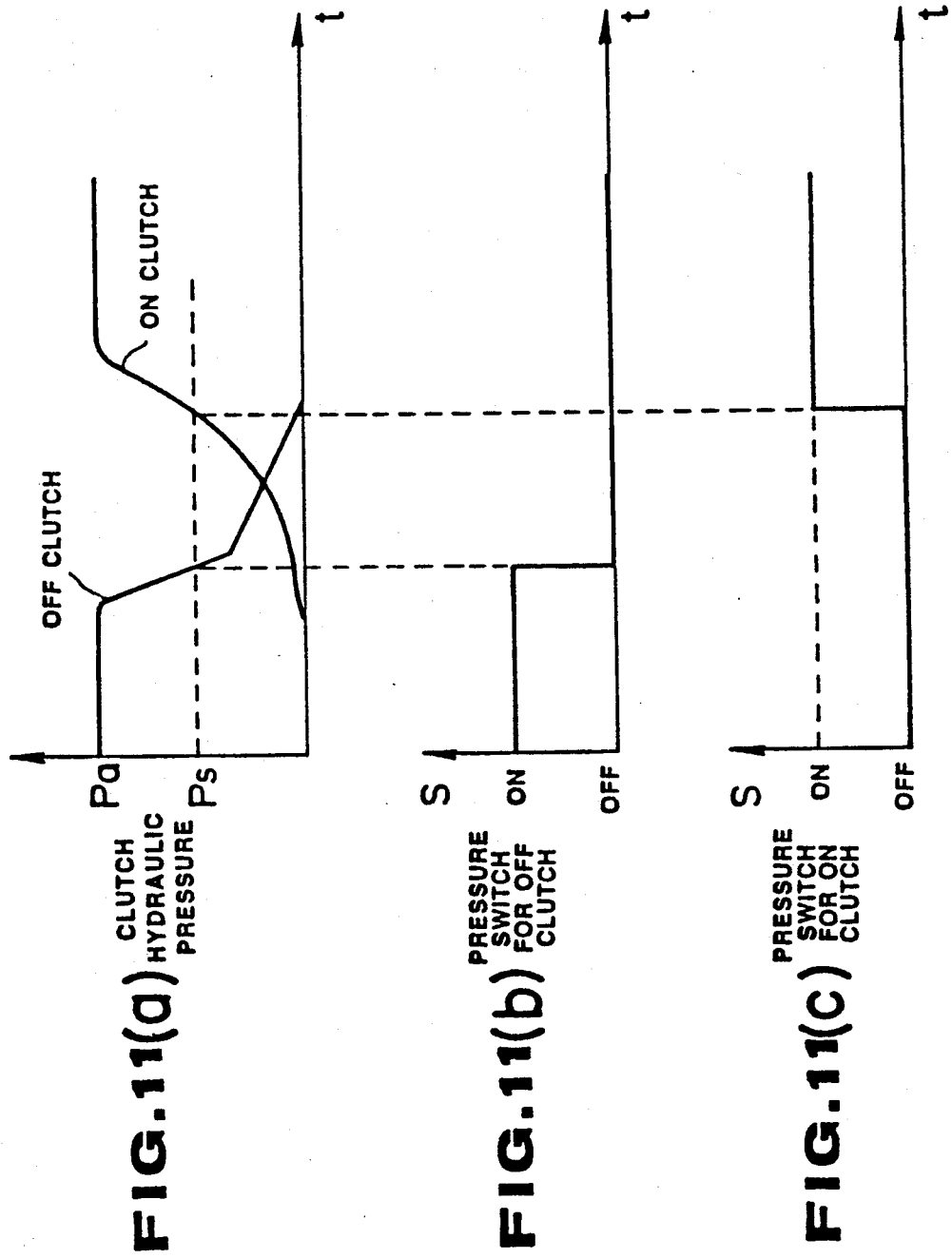
FIGS. 11(a), 11(b) and 11(c) show a plurality of time charts illustrating by away of example operation of a pressure switch.

The respective clutches are equipped with a plurality of corresponding pressure switches 101 to 106 to monitor clutch pressure. FIGS. 11(a), 11(b) and 11(c) show a plurality of time charts which illustrate a relationship between hydraulic pressure in each clutch and detection signal S from each of the pressure switches 101 to 106. The pressure switches 101 to 106 are turned on when clutch pressure is higher than a preset pressure $P_s$ (value of about a half of clutch set pressure $P_a$), while they are turned off when clutch pressure is lower than the preset pressure $P_s$. In FIG. 10, reference numeral 80 designates a gear selector lever which is actuated by an operator and reference numerals 83 and 84 designate a lamp, respectively, which is lightened in the event of an occurrence of abnormality.

With such arrangement, solenoid driving electric currents $I_1$ to $I_6$ outputted from the drive circuits 91 to 96 and detection signals $S_1$ to $S_6$ of the pressure switches 101 to 106 are inputted into the controller 70 so that the controller 70 senses troubles of the drive circuits 91 to 96 and the clutch housings based on the inputted signals. Specifically, the controller 70 compares the clutch pressure command signals $C_1$ to $C_6$ outputted the controller 70 itself with the solenoid drive electric currents $I_1$ to $I_6$, and when it is found that there occurs non-coincidence away from the proportional relationship among these signals, the controller 70 senses this non-coincidence as trouble with the drive circuits 91 to 96. Further, the controller 70 compares the clutch pressure command signals $C_1$ to $C_6$ with the detection signals $S_1$ to $_6$ of the pressure switches 101 to 106 and then determines the presence or absence of trouble with the clutch housings based on results derived from the comparison among these signals. For example, in a case where, when the controller 70 does not output clutch pressure command signals, the pressure switch on the relevant clutch is turned on or in the reverse case to the foregoing one, the controller 70 can determine that such case represents an occurrence of some trouble.

With this apparatus for the gear box, as shown in FIG. 11(a), properties of accelerating and running are improved by carrying out crossover control which is such that build-down control for a clutch to be turned off during shift change intersects build-up control for a clutch to be turned on during shift change. In the case of the build-down control, since detection signal from the pressure switch connected to the OFF clutch is turned off at the time point when hydraulic pressure is reduced below the set pressure $P_s$, the controller 70 can confirm, by sensing the foregoing state, that the clutch to be turned off has been released from the engaged state (see FIG. 11(b)). In the case of the build-up control, since detection signal from the pressure switch connected to the ON clutch is turned on at the time point when hydraulic pressure is increased above the preset pressure $P_s$, the controller 70 can confirm, by sensing the foregoing state, that the clutch to be turned on has been brought in an engaged state or is being brought in an engaged state (see FIG. 11(C)).

Figure 12:
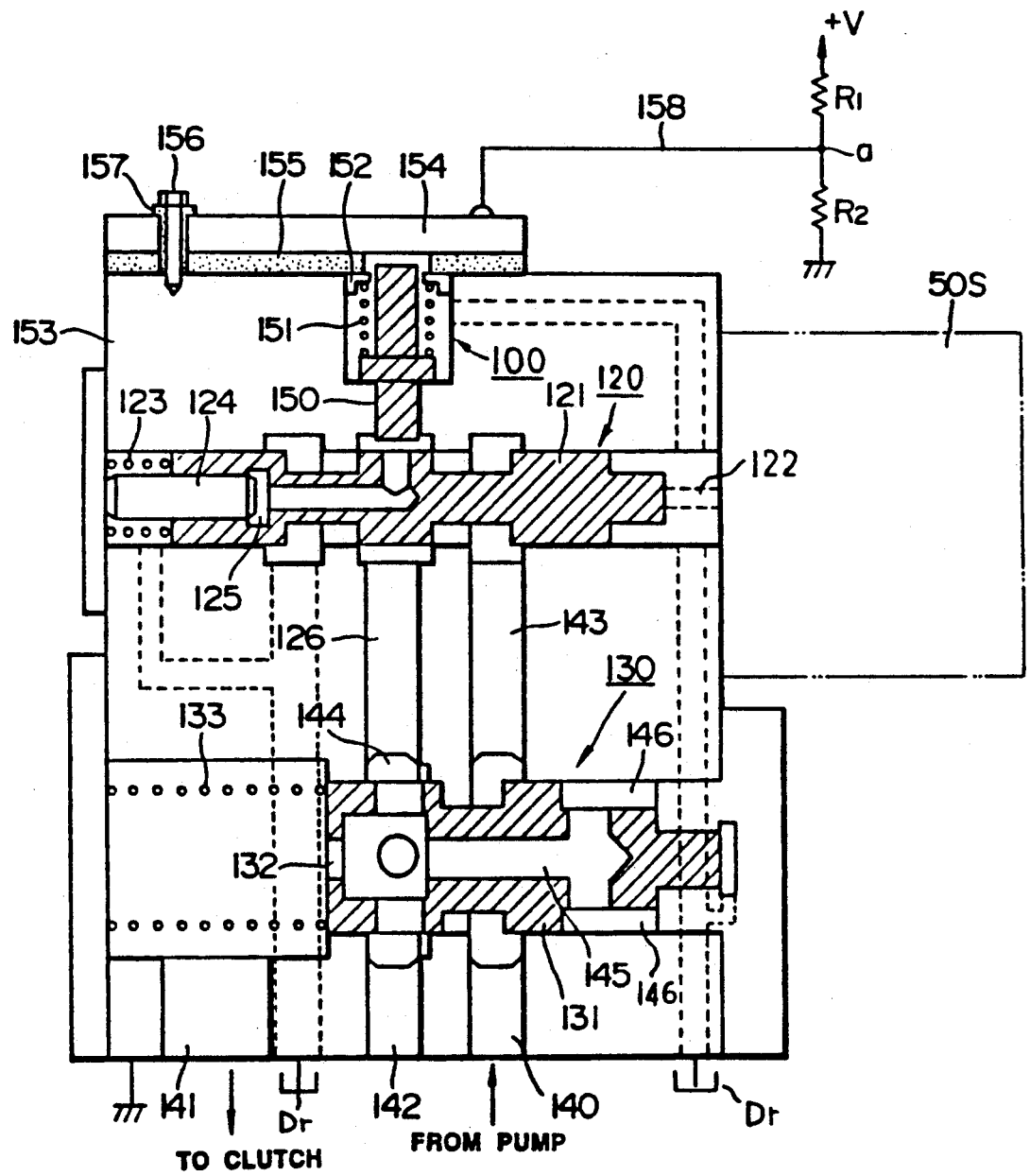
FIG. 12 is a sectional view which schematically illustrates the inner structure of a pressure control valve and a pressure switch.

FIG. 12 is a sectional view which schematically illustrates by way of example the inner structure of the pressure control valves 51 to 56 and the pressure switches 101 to 106 both of which control hydraulic pressure in the respective clutches. With the structure shown in FIG. 12, a flow rat detecting valve 130 is additionally provided in the vicinity of the pressure control valve 120 so as to allow a large quantity of hydraulic oil to be delivered to the relevant clutch at a high flow rate.

Namely, this valve comprises an electronic type pressure control valve 120, a flow rate detecting valve 130 and a pressure switch 100, and the pressure control valve 120 is driven in response to an electrical command from the controller 70. Hydraulic oil delivered from the hydraulic pump 82 is introduced into this valve via an input port 140 and it is then delivered to the relevant clutch via an output port 141. A port 142 is kept closed.

The electronic type pressure control valve 120 includes a spool 121 of which right-hand end comes in contact with the plunger 122 of the proportional solenoid 50S and of which left-hand end is resiliently supported by a spring 123. Hydraulic pressure in a hydraulic passage 126 is transmitted to a hydraulic chamber 125 defined by the spool 121 and the piston 124.

The flow rate detecting valve 130 includes a spool 131 of which left-hand end is resiliently supported by a spring 133, while an orifice 132 is formed on the output port 141 side.

The pressure switch 100 is disposed at one end of the hydraulic passage 126 to detect a clutch pressure. The pressure detecting switch 100 comprises a pressure detecting piston 150 and a spring 151 for resiliently support the piston 150. The spring 151 energizes the piston 150 via a spring guide 152 with a spring force of which intensity is determined such that the piston 150 does not move back as long as the clutch hydraulic pressure, i.e., hydraulic pressure in the hydraulic passage 126 is kept lower than the preset pressure $P_s$. The piston 150 comes in contact with a valve body 153 but normally does not come in contact with a cover 154 made of ferrous metallic material. When the clutch pressure exceeds the energizing force of the spring 151 and thereby the piston 150 is displaced upwardly, the piston 150 is brought in contact with the cover 154. The cover 154 made of ferrous metallic material is electrically isolated from the valve body 153 with an electrical insulating sheet 155 interposed therebetween. Additionally, cover fitting bolts 156 are electrically isolated from the cover 154 using electrical insulating sleeve 157.

A lead wire 158 extends from the cover 154 to be connected to an a point intermediate between a resistor $R_1$ and a resistor $R_2$ which are connected in series to each other. A predetermined magnitude of DC voltage V (e.g., 12V) is applied to the circuit between the both resistors $R_1$ and $R_2$ and the valve body 153 is earthed. As represented by dotted lines in the drawing, a plurality of hydraulic chambers are connected to drains Dr.

Figure 13:
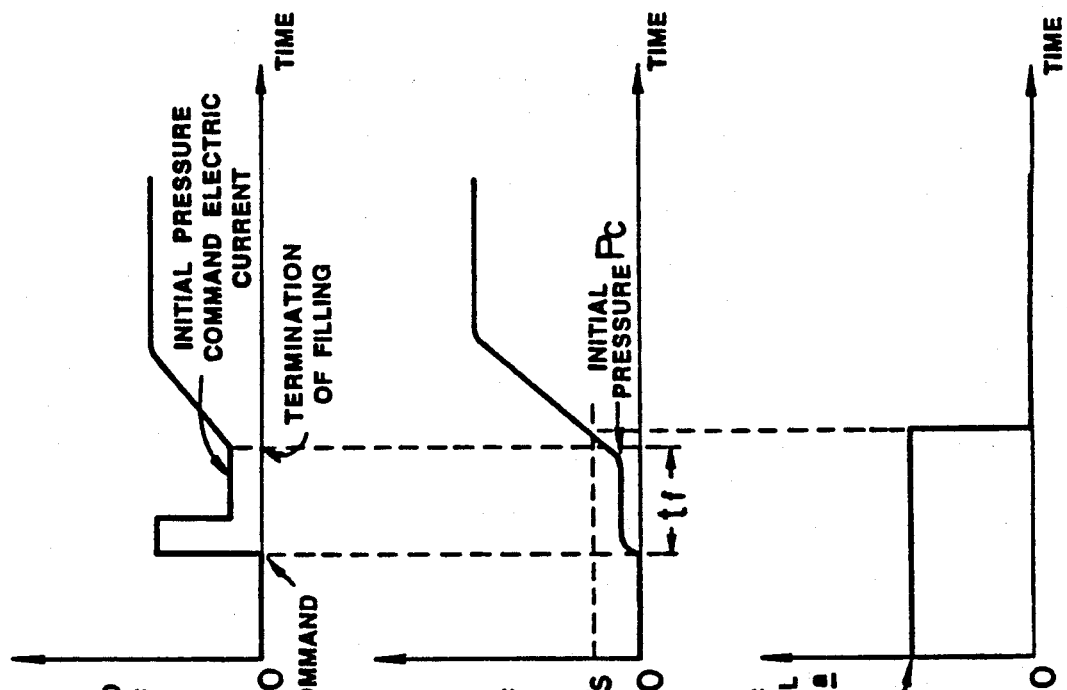
FIGS. 13(a) and 13(b) show a plurality of time charts which illustrate by way of example concrete operations of the pressure control valve in FIG. 12, FIGS. 14, 15(a), 15(b), 15(c), 16(a), 16(b) and 16(c) are a flowchart, respectively, which illustrates by way of example operation of the apparatus in accordance with the embodiment of the present invention

Next, operation of the valve as constructed in the above-described manner will be described with reference to FIGS. 13(a), 13(b) and 13(c) show a plurality of time charts. When the relevant clutch should be brought in an engaged state, the controller 70 inputs a trigger command into the solenoid 50S of the valve which is hydraulically connected to the relevant clutch (see FIG. 13(a)). In response to the inputted trigger command, the spool 121 of the pressure control valve 120 is displaced in the leftward direction so that hydraulic oil delivered from the hydraulic pump flows in the pressure control valve 120 via the input port 140 and the hydraulic passage 143. The hydraulic oil which has been introduced into the pressure control valve 120 flows in the flow rate detecting valve 130 via the hydraulic passage 126 and the port 144 and then is delivered to the clutch from the output port 141 via an orifice 132 formed on the spool 131. Further, the hydraulic oil which has entered via the port 144 is delivered to a hydraulic chamber 146 via a hydraulic passage 145 formed in the spool 131.

This caused a differential pressure to appears across the orifice 132, whereby the spool 131 is displaced in the leftward direction by the differential pressure until the flow rate detecting valve 130 is opened. Consequently, the pressurized hydraulic oil which has flowed in the input port 140 enters directly into the port 144 and then is delivered to the relevant clutch via the orifice 132. Supply of the hydraulic oil continues until the clutch pack is fully filled with the hydraulic oil.

As shown in FIG. 13(b), hydraulic pressure in the clutch pack is held at a level of approximate zero for a period of the filling time $t_f$ until the clutch pack is fully filled with hydraulic oil. Since hydraulic pressure in the clutch pack does not reach the set pressure $P_s$ of the spring 151, the upper end face of the piston 150 in the pressure detecting switch 100 does not come in contact with the cover 154 made of ferrous metallic material. As long as the foregoing state is maintained, an electric potential at the point assumes a voltage value (representing that the relevant clutch is turned on) derived by dividing the voltage V with the resistors $R_1$ and $R_2$, as shown in FIG. 13(c).

When the clutch pack is filled with hydraulic oil, the filling is terminated and no hydraulic oil flows any more. Thus, the differential pressure generated across the orifice 132 disappears with the result that the spool 131 of the flow rate detecting valve 130 is displaced in the rightward direction by the spring 131 and thereby the flow rate detecting valve 130 is restored to the closed state. After completion of the filling, the controller 70 gradually increases an intensity of electric current to be fed to the solenoid 50S, from the value of initial pressure command electric current as shown in FIG. 13(a).

Consequently, clutch hydraulic pressure is gradually increased from the initial pressure Pc (about 2 Kg/cm$^2$), as shown in FIG. 13(b). Since the set pressure Ps of the spring is set to a value appreciably larger than the initial pressure Pc, the clutch hydraulic pressure exceeds the set value Ps later, as it is gradually increased in that way. The clutch hydraulic pressure overcomes the energizing force of the spring 151 and thereby the piston 150 is displaced upwardly until the upper end face of the piston 150 come in contact with the cover 154. As a result, the cover 154 made of ferrous metallic material is earthed via the piston 150, whereby it is electrically communicated with the valve body 153. Thus, the electric potential at the point a is lowered to a level of zero as shown in FIG. 13(c) (representing that the relevant clutch is turned off) and thereby no voltage appears at the point a.

Namely, with the structure as shown in FIG. 12, the presence or absence of hydraulic pressure in the clutch pack is detected by displacement of the piston received at one end of the hydraulic passage 126, toward or away from the cover 154 so that the displacement of the piston 150 toward or away from the cover 154 is electrically detected in the form of variation of voltage at the point a. Accordingly, an operator can know the presence or absence of clutch hydraulic pressure by examining the presence or absence of electric potential at the point a. It should be noted that the pressure switch 100 shown in FIG. 4 is opposite to that shown in FIG. 10 in respect to on/off operation. To assure that the both pressure switches coincide with each other in respect of an on/off relationship, it is required that electrical connection is properly inverted using an inverter or the like means.

Next, a series of processings for detecting an abnormality with the use of the controller 70 and a series of countermeasures to be taken after detection of the abnormality will be described below with reference to flowcharts shown in FIGS. 14, 15(a), 15(b), 15(c), 16(a), 16(b) and 16(c).

Figure 14:
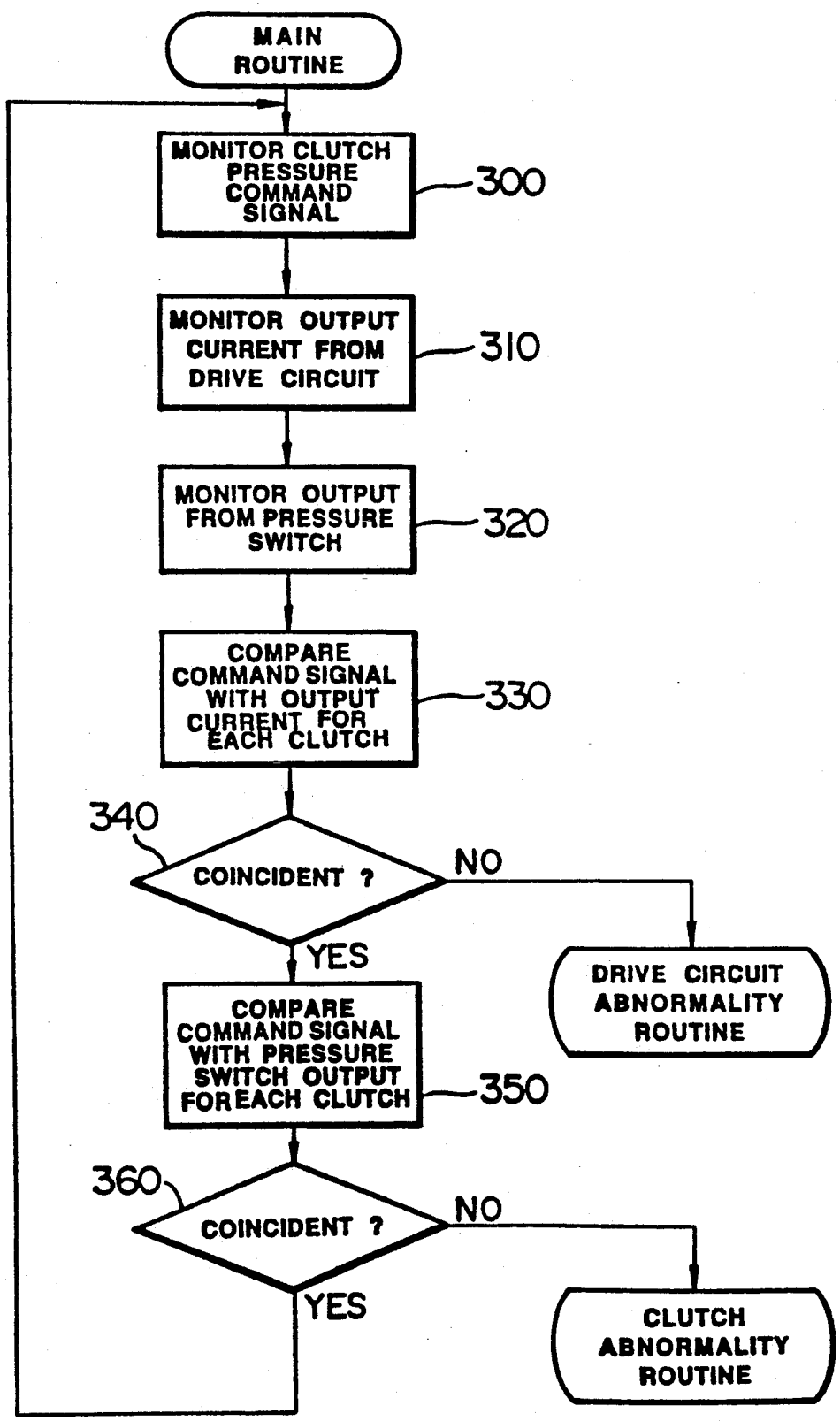

FIG. 14 shows a flowchart which illustrates a series of detecting an occurrence of abnormality with the use of the controller 70. The controller 70 monitors clutch pressure command signals $C_1$ to $C_6$ outputted from the controller 70 itself, detection signals $I_1$ to $I_6$ of the electric current detectors 161 to 166 and detection signals $S_1$ to $S_6$ of the pressure switches 101 to 106 (steps 300 to 320). The controller 70 makes a comparison between the clutch pressure command signals $C_1$ to $C_6$ and the solenoid drive signals $I_1$ to $I_6$ for each clutch (step 330). In case where it is found that there is existent non-coincidence between the both signals which is away from the proportional relationship therebetween, the process shifts to a drive circuit abnormality routine in which a series of processings are performed. Further, the controller 70 makes a comparison between the clutch pressure command signals $C_1$ to $C_6$ and the detection signals $S_1$ to $S_6$ of the pressure switches 101 to 106 for each clutches (step 350). In case where it is found that there is existent non-coincidence between the both signals which is away from the corresponding relationship therebetween (step 360), the process shifts to a clutch abnormality routine in which a series of processings are performed.

Figure 15A:
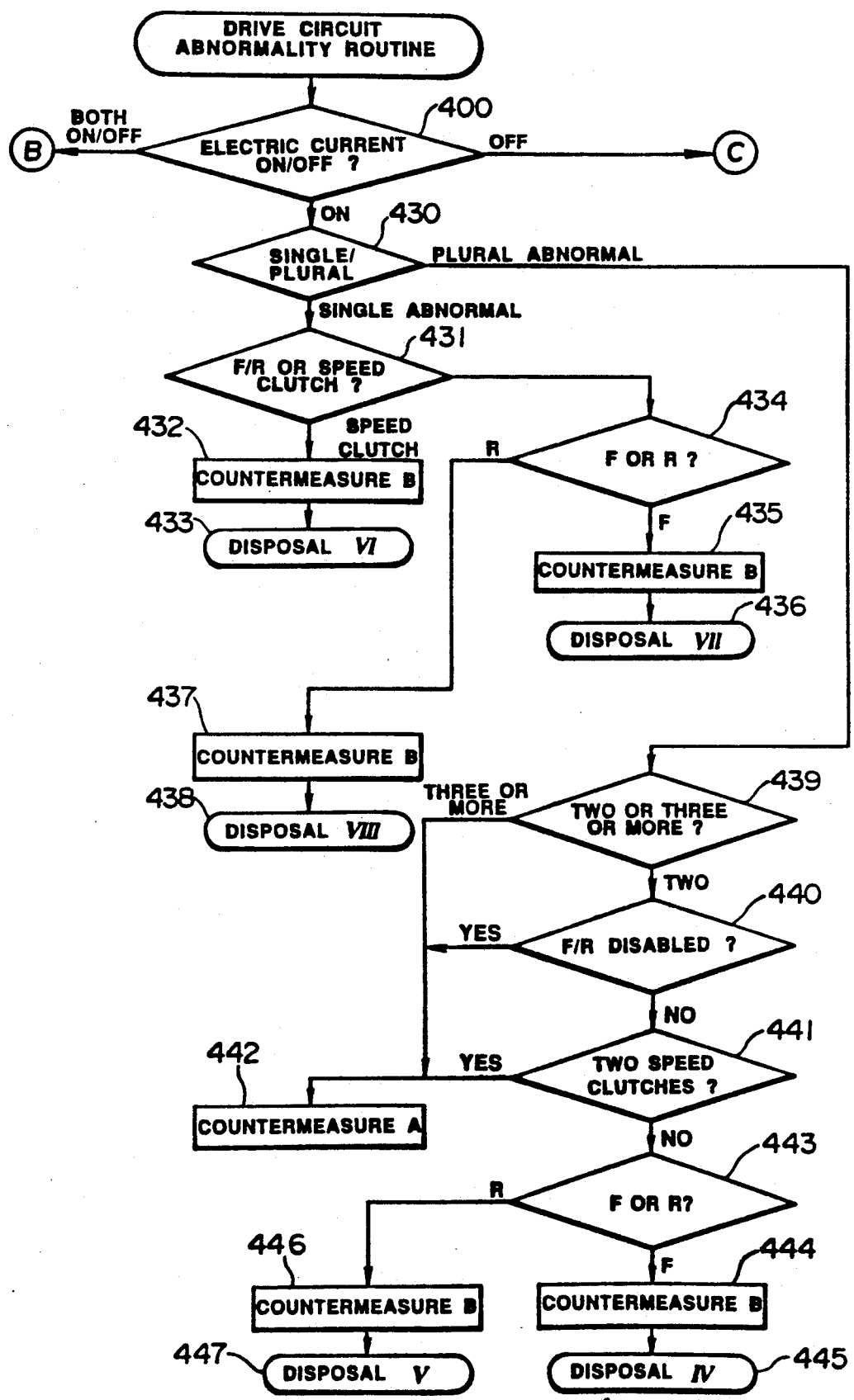
Figure 15B:
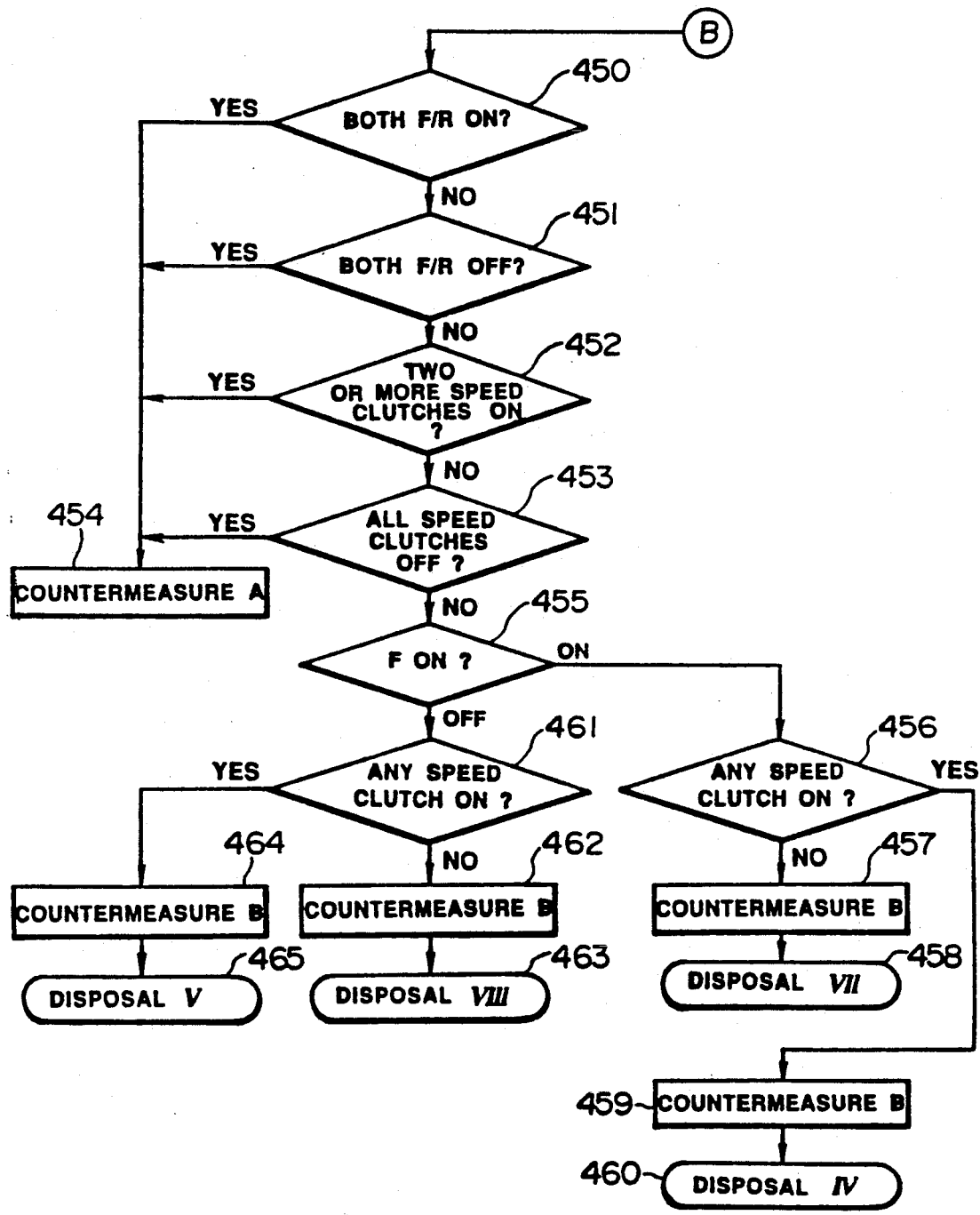
Figure 15C:
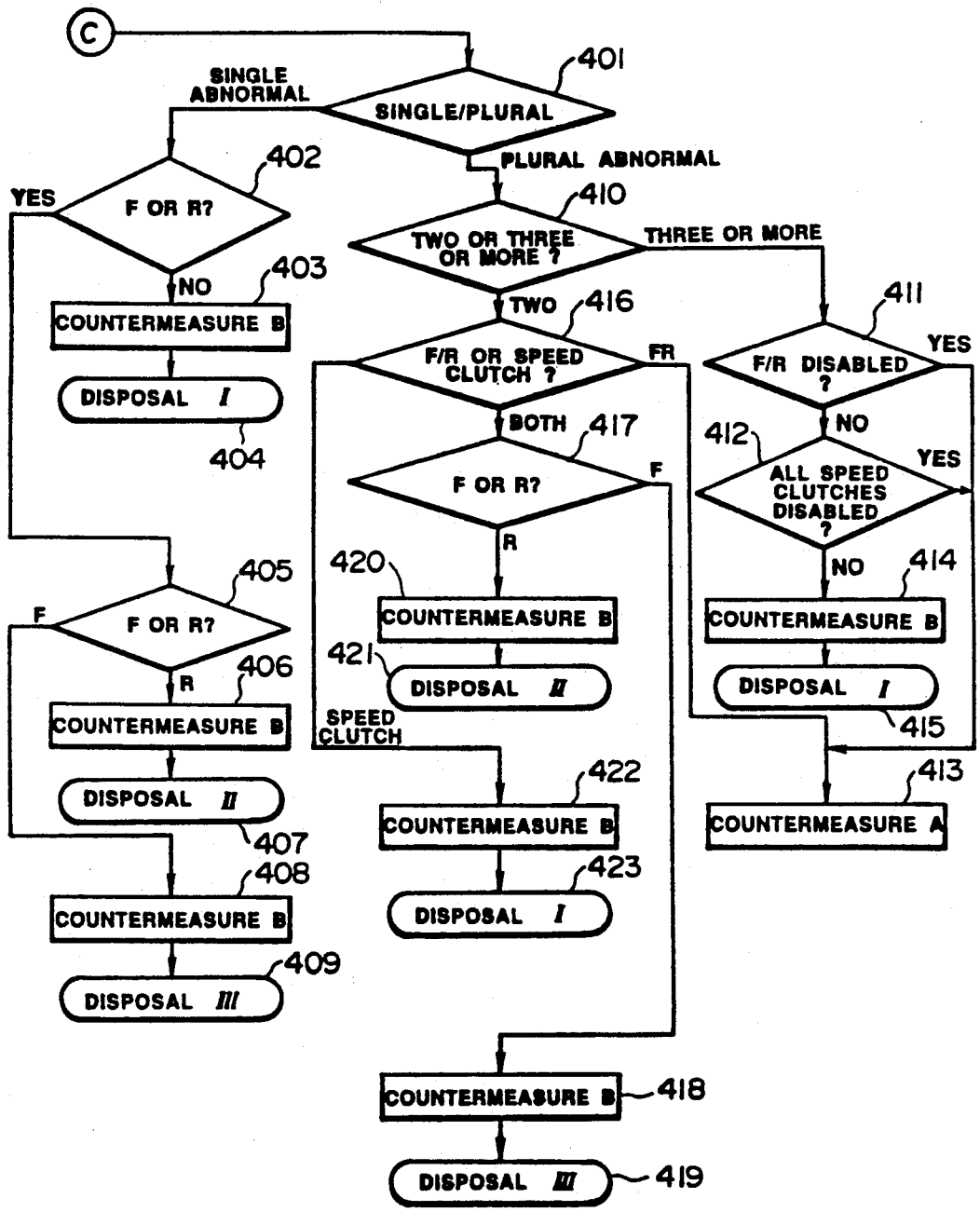

According to the drive circuit abnormality routine shown in FIGS. 15(a), 15(b) and 15(c) first, the controller 70 makes a determination as to any one of three cases, i.e., one case where the solenoid driving electric current corresponding to the clutches (one or more) which have been determined as non-coincidence at the step 340 is turned on (hereinafter referred to as ON state), other case where it is turned off (hereinafter referred to as OFF state) and another case where both the ON state and the OFF state are existent in a mixed state (step 400).

In case where it is determined that a trouble which takes place in the OFF state with the solenoid driving current, the controller 70 makes a determination as to whether there is a single abnormal clutch or there are plural abnormal clutch (step 401). In case where it is found that there is a single abnormal clutch, next, the controller 70 makes a determination as to whether or not the abnormal clutches are the forward movement clutch F and rearward movement clutch R among the six clutches F,R, 1 to 4 (step 402). In case where the controller 70 determines that the abnormal clutches are not the forward movement clutch F and the rearward movement clutch R but any one or ones of the speed clutches 1 to 4, the blue lamp 83 is lightened (countermeasure B, step 403) and thereafter, the process goes to a state wherein shift change can be effected only with the controllable speed clutches to shift only to the lowest speed stage for forward movement and the lowest speed stage for rearward movement (disposal I, step 404).

Here, the countermeasure B is intended for the trouble which has taken place at the state where the vehicle is ready to move. In detail, the countermeasure B is such that after the blue lamp 83 is lightened, one of eight disposals shown in Table 1 is executed so as to allow the lowest speed stage required for the vehicle from the viewpoint of necessity to be available so that the vehicle can move to a location where a repairing operation can be performed or to a refuge zone. Thus, when there occurs an abnormality which is associated with the countermeasure B, the controllable clutches are temporarily turned off and then only clutch or clutches among them corresponding to a suitable speed stage are held in an usable state.

TABLE 1

| Disposal I | Only the lowest speed stage for forward movement and the lowest speed stage for rearward movement are held in a speed changeable state using controllable clutch or clutches. |
|---|---|
| Disposal II | Only the lowest speed stage for forward movement is held in the speed changeable state using controllable clutch or clutches. |
| Disposal III | Only the lowest speed stage for rearward movement is held in the speed changeable state using controllable clutch or clutches. |
| Disposal IV | Only the speed stage having an uncontrollable forward movement clutch F and an uncontrollable speed clutch used therefor is held in an usable state. |
| Disposal V | Only the speed stage having an uncontrollable rearward movement clutch R and an uncontrollable speed clutch used therefor is held in an usable state. |
| Disposal VI | The speed stage having an uncontrollable speed clutch used therefor is held in an usable state only for forward/rearward movement. |
| Disposal VII | Only the lowest speed stage for forward movement is held in an usable state using an uncontrollable forward movement clutch F. |
| Disposal VIII | Only the lowest speed stage for rearward movement is held in an usable state using an uncontrollable rearward movement in clutch R. |

When a result derived from the determination at the step 402 is YES, the controller 70 makes a determination at a step 405 as to that a trouble takes place with either of the forward movement clutch F and the rearward movement clutch R. When it is found that a trouble takes place with the rearward movement clutch R, the blue lamp 83 is lightened (step 406) and thereafter the disposal II is executed (step 407 (see Table 1)). When it is found that a trouble takes place with the forward movement clutch F, the blue lamp 83 is lightened (step 408) and thereafter the disposal III is executed (step 409 (see table 1)).

In case where it is determined at the step 401 that a plurality of clutches are abnormal, first, the controller 70 makes a determination as to whether three or more clutches are abnormal or two clutches are abnormal (step 410). When it is found that three or more clutches are abnormal, a red lamp 84 is lightened only when both the forward movement clutch F and the rearward movement clutch R simultaneously break down (step 411) or all the speed clutches break down (step 412) and then all the clutches are turned off (countermeasure A, step 413).

Here, the countermeasure A is intended for a trouble with which the vehicle can not move any more. With the countermeasure A, the red lamp 84 is lightened and all the clutches are turned off. An operator is instructed with a manual or the like means so as to stop the engine immediately after the red lamp 84 is lightened.

When a result derived from the determinations at the steps 411 and 412 is NO, the controller 70 executes the disposal I (step 415) after the blue lamp 83 is lightened (step 414), because one of the forward movement clutch, the rearward movement clutch and the speed clutches remain still in an usable state.

In case where it is determined at the step 410 that two clutches are abnormal, the controller 70 makes a determination as to whether the two abnormal clutches are the forward movement clutch F and the rearward movement clutch R or t hey are two clutches among the speed clutches 1 to 4 or they are two clutches among the forward movement clutch, the rearward movement clutch and the speed clutches (step 416). When it is found that the abnormal clutches are both the forward movement clutch F and the rearward movement clutch R, a countermeasure A is taken to lighten the lamp 84 (step 413). When it is found that the abnormal clutches are two clutches among the speed clutches, a countermeasure B is taken to lighten the blue lamp 83 (step 422) and thereafter the disposal I is executed (step 423 (see Table 1)). Further, when it is found that one of the two abnormal clutches is the forward movement clutch F (step 417), the countermeasure B is taken and the disposal III (see Table 1) is executed (steps 418 and 419). However, when it is found that one of the two abnormal clutches is the rearward movement clutch R, the countermeasure B is taken and the disposal II is executed (steps 420 and 421).

Next, in case where it is determined at the step 400 that a trouble takes place while the solenoid driving current is turned on, the controller 70 makes a determination as to whether a single clutch is abnormal or a plurality of clutches are abnormal (step 430). When it is found that a single clutch is abnormal, the controller 70 makes a determination as to which one of the forward movement clutch F, the rearward movement clutch R and the speed clutches 1 to 4 represents the single abnormal clutch (step 431). When it is found that the speed clutches break down, the blue lamp is lightened (step 432) and then the controller 70 makes it possible to perform only forward movement and/or rearward movement at the speed stage corresponding to the abnormal speed clutch or clutches while the foregoing ON state is maintained (step 433, disposal VI). In case where a trouble takes place with the forward movement clutch F which is turned on, the controller 70 operates such that the countermeasure B is taken and the disposal VII is executed (steps 434 and 435). In case where a trouble takes place with the rearward movement clutch R which is turned on, the controller 70 operates such that the countermeasure B is taken and the disposal VIII is executed (steps 437 and 438).

In case it is determined at the step 430 that troubles take place with a plurality of clutches which are turned on, the controller 70 operates such that the countermeasure A is taken to lighten the red lamp (442), only when three or more clutches which are turned on break down (step 439) or the forward movement clutch F and the rearward movement clutch R break down simultaneously (step 440) or two clutches among the speed clutches which are turned on break down (step 441).

In case where it is found that one of the two abnormal clutches which are turned on is the forward movement clutch F and the residual one is one of the speed clutches, the controller 70 makes it possible to use only the forward movement speed stages which are selected by the abnormal forward movement clutch F and the abnormal speed clutch each of which is turned on (steps 444, 445). Similarly, in case where it is found that one of the two abnormal clutches which are turned on is the rearward movement clutch R, the countermeasure B is taken and the disposal V is executed (steps 446 and 447).

Figure 16A:
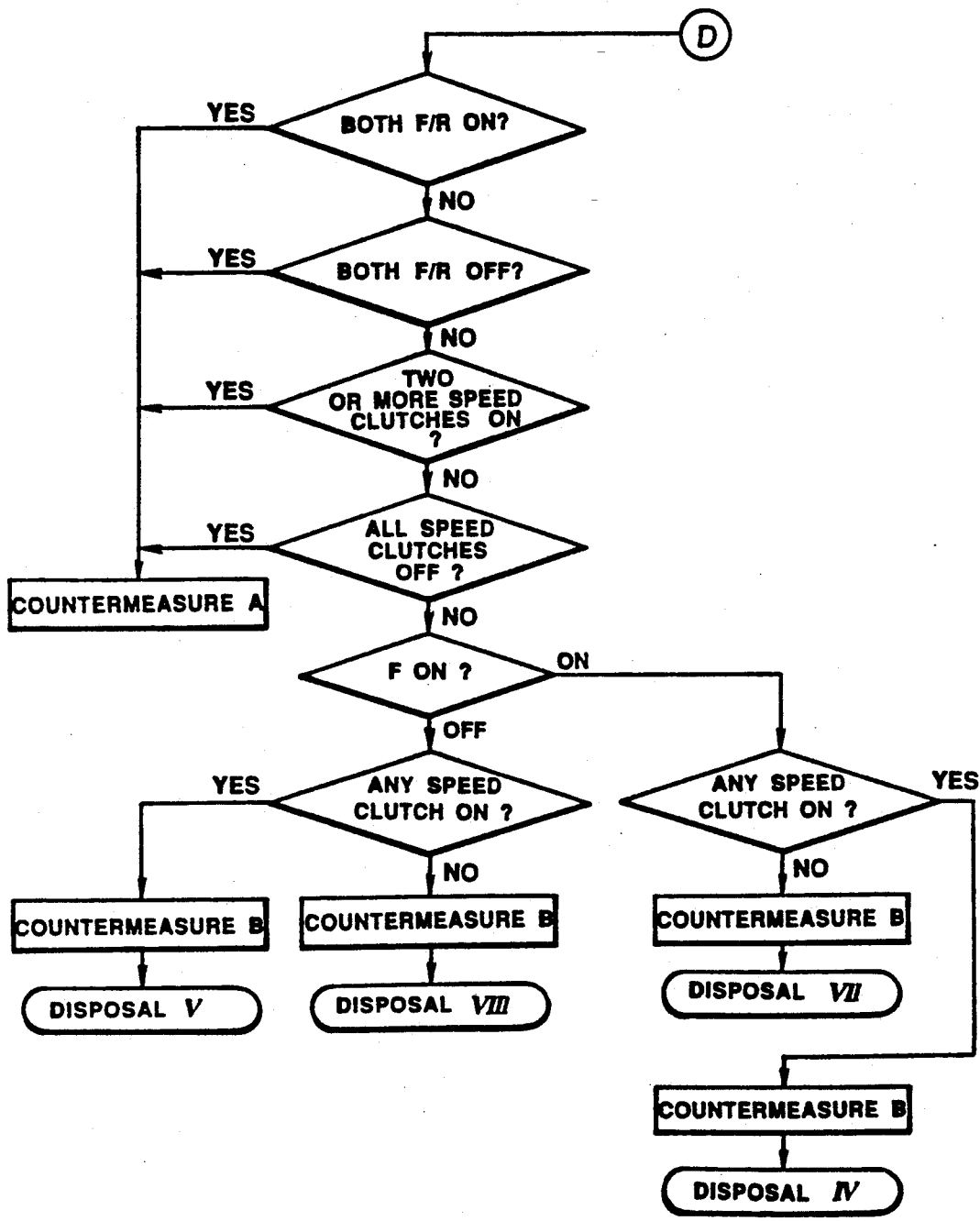
Figure 16B:
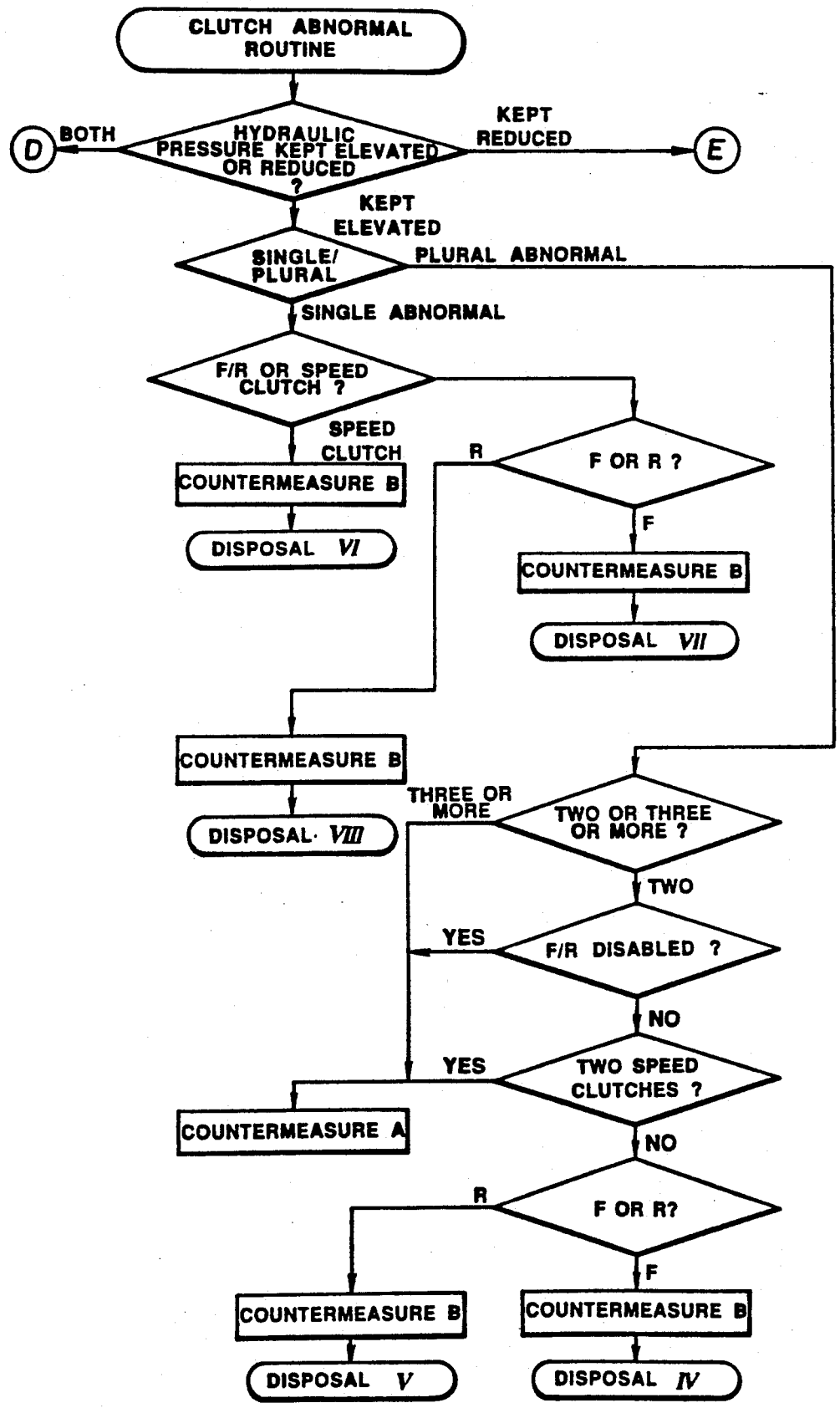
Figure 16C:
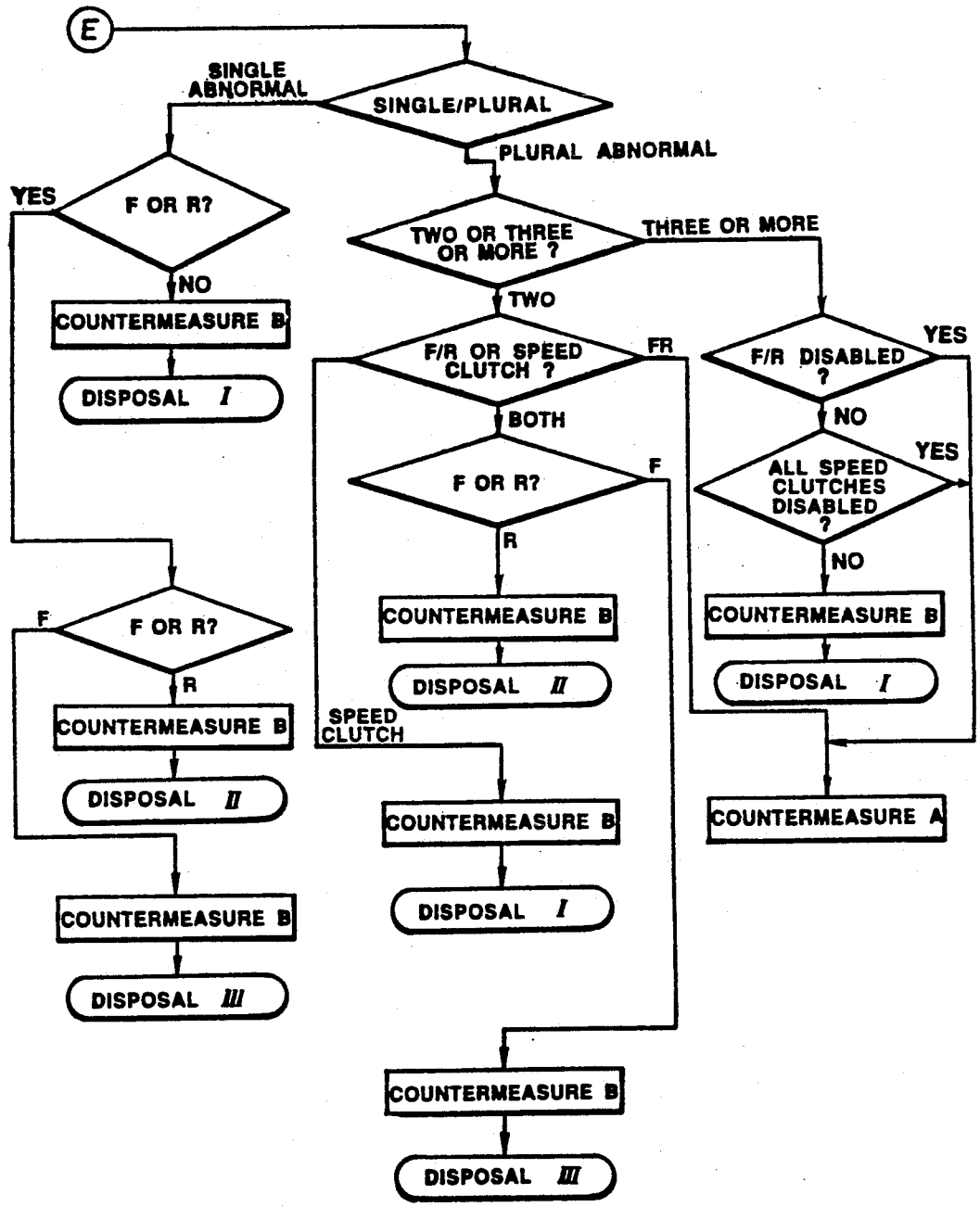

Next, when it is found at the step 400 that two troubles take place simultaneously, i.e., one trouble takes place while the solenoid driving electric current is turned on and another trouble takes place while it is turned off, the controller 70 operates such that the countermeasure A is taken (step 454), only when both the forward movement clutch F and the rearward movement clutch R are turned on (step 450) or both the forward movement clutch F and the rearward movement clutch R are turned off (step 451) or the two or more speed clutches are turned on (step 452) or all the speed clutch are turned off (453). In case where the above-described conditions are not established and a trouble takes place with the forward movement clutch F which is turned on (step 455), the controller 70 determines whether any one of the speed clutches which are turned on breaks down or not (step 456). If a result derived from the determination is YES, the countermeasure B is taken and the disposal IV is executed (steps 457 and 458) and if the result is NO, the countermeasure B is taken but the disposal VII is executed (steps 457 and 458). When it is determined at the step 455 that a trouble takes place with the rearward movement clutch which is turned on, the countermeasure B is taken and the disposal V is executed in the same manner as described above (steps 464 and 465), if it is found that a trouble takes place with some one of the speed clutches which are turned on. In this case, however, when it is found that no trouble takes place with the speed clutches which are turned on, the countermeasure B is taken and the disposal VIII is executed (steps 462 and 463). FIGS. 16(a), 16(b) and 16(c) are flow charts which illustrate a clutch abnormality routine. This routine is different from the drive circuit abnormality routine as represented by the flowchart in FIGS. 15(a), 15(b) and 15(c) only in respect of a processing of determining at a first step 500 but a procedure of all processings other than the foregoing one is same as that of the drive circuit abnormality routine in FIGS. 15(a), 15(b) and 15(c). Accordingly, repeated description will not be required with respect to the same steps, disposals and countermeasures. In detail, at the step 500, the controller 70 makes a determination as to whether a trouble takes place with the clutch which exhibits non-coincidence based on the determination at the step 360 (FIG. 14) as hydraulic pressure is kept increased or a trouble takes place as hydraulic pressure is kept reduced or a trouble takes place in the presence of the foregoing two states. Thereafter, a series of processings are executed in accordance with the same procedure as mentioned above.

Specifically, with a series of abnormality processings accompanied by adequate countermeasures as shown in FIGS. 14 to 16(a), 16(b) and 16(c) the controller 70 compares the clutch pressure command signals $C_1$ to $C_6$ with the solenoid driving electric currents $I_1$ to $I_6$ and the outputs $S_1$ to $S_6$ from the pressure switches. When it is found that no solenoid driving electric current flows and each clutch is kept filled with pressurized hydraulic oil in spite of outputting of the clutch pressure command signal or in the case of the reversal state to the foregoing one, the controller 70 senses this as an abnormality. When an abnormality is detected and it is found that each clutch is brought in an engaged state so as to allow the vehicle to move, the vehicle is held in an operatively usable state at the lowest speed stage required from the viewpoint of necessity, which makes it possible that the vehicle moves by itself to a location where a repairing operation can be performed or to a refuge zone.

Figure 17:
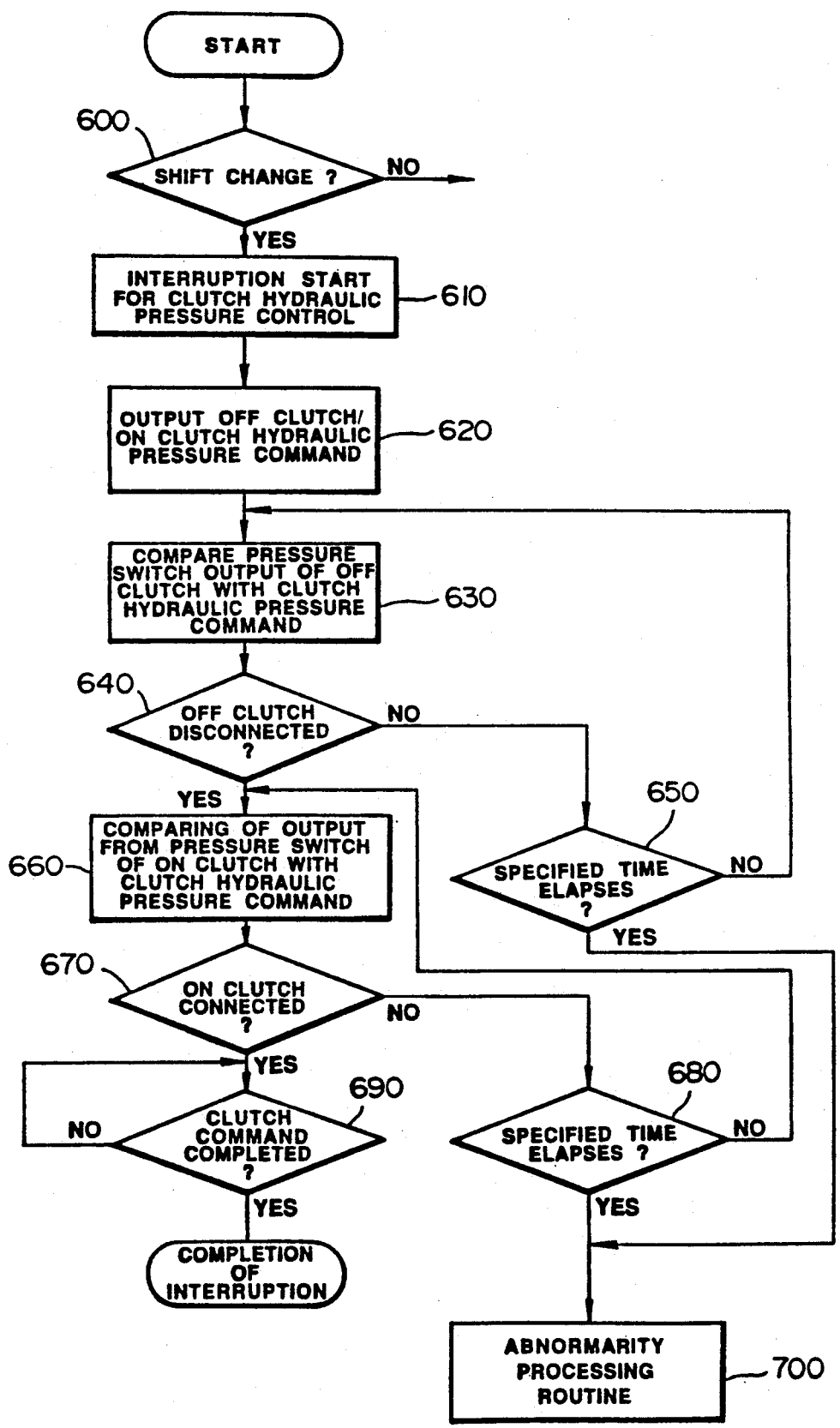
FIGS. 17 and 18 are a flowchart, respectively, which illustrates by way of example operations of an apparatus for controlling a gear box in accordance with an embodiment of a third embodiment.

Next, an apparatus in accordance with another embodiment of the present invention will be described below with reference to flowcharts shown in FIGS. 17 and 18.

With the shown controlling system, the controller 70 starts a clutch hydraulic pressure control interruption when it performs shift change (steps 600 and 610). During this interruption processing, first, the controller 70 outputs a clutch hydraulic pressure command as shown in FIG. 11(a) to clutches to be turned off and clutches to be turned on so as to carry out crossover control (step 620). After the hydraulic pressure is outputted in that way, a detection signal of the pressure switch connected to a clutch to be turned off is compared with the hydraulic pressure command outputted to this clutch (step 630). If the detection signal of the pressure switch is not turned off even after a specified period of time elapses, the controller 70 regards this as an abnormality. Then, the process shifts to an abnormality processing routine to perform subsequent processings (steps 640, 650 and 700). Further, the controller 70 compares a detection signal of the pressure switch connected to a clutch to be turned on with the hydraulic pressure command outputted to this clutch (step 660). In case where the detection signal of the pressure switch is not turned on even after the specified period of time elapses, the controller 70 regards this as an abnormality. Then, the process shifts to the abnormality processing routine to perform subsequent processings (steps 670, 680 and 700).

When it is confirmed as a result of comparing the detection signal of the pressure switch with the hydraulic pressure command that a normal shift change operation is performed, the interruption processing is terminated (step 690).

Figure 18:
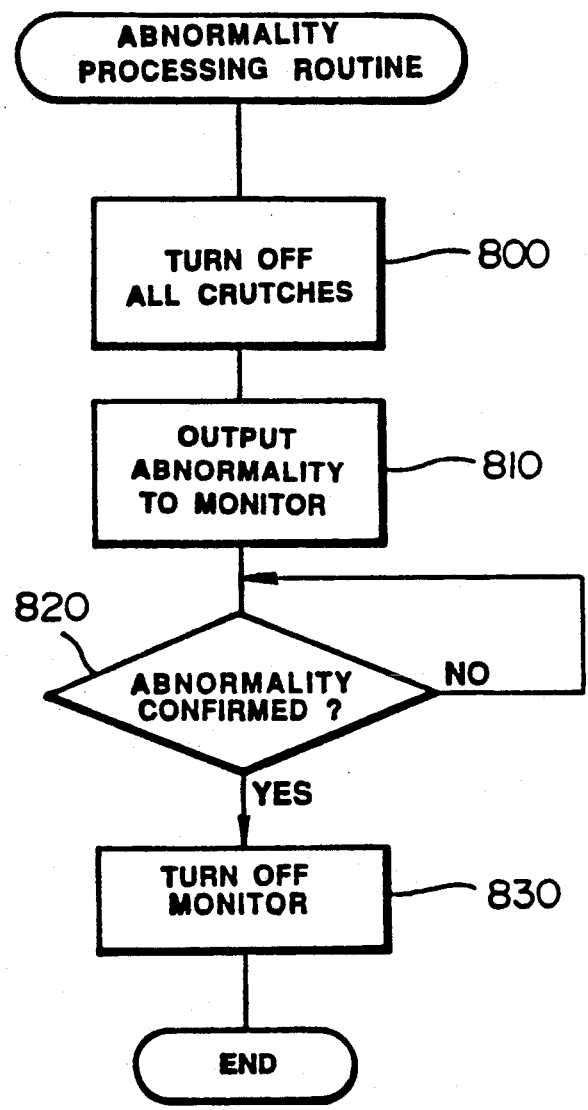

FIG. 18 is a flowchart which illustrates an abnormality processing routine. When the controller 70 senses an abnormality by the foregoing processings, the controller 70 operates such that all the clutches are turned off by immediately reducing the command hydraulic pressure fed to all the clutches (step 800) and thereafter displays on a display monitor which clutch is abnormal (step 810). Thereafter, the controller 70 turns off the display monitor when a signal representing that the presence of an abnormality is confirmed is outputted from an operator (steps 820 and 830).

Specifically, according to the embodiment of the present invention, each clutch in the gear box is provided with a pressure switch adapted to output on/off binary signals with a specified clutch pressure as a threshold, whereby a command signal outputted from the controller 70 are normally compared with a detection signal of the pressure switch. When the both signals do not coincide with each other, all the clutches are immediately turned off and an abnormality with these clutches is informed to an operator.

In connection with the above-described embodiments of the present invention, FIG. 12 shows merely an example of the pressure switch. Alternatively, other arbitrarily constructed pressure switch may be employed, if it is proven that it exhibits the same functions as those of the foregoing switch. Instead of this pressure sensor, an usual pressure sensor may be used for the same purpose. Further, the structure of clutches in the transmission should not be limited only to that shown in FIG. 2. The present invention may be applied to a transmission which is constructed in other arbitrary manner.

Additionally, the present invention can equally be applied to any one of a manual shift vehicle, an automatic shift vehicle and a manual shift/automatic shift vehicle.

INDUSTRIAL APPLICABILITY

The present invention is advantageously employable for a transmission installed on a construction machine such as wheel loader, dump truck or the like machine and a passenger car.

We claim:

1. An apparatus for controlling a gear box which is individually connected to a plurality of pressure control valves adapted to be actuated in response to electrical commands to be issued to a plurality of shift change clutches, said apparatus comprising;
    shift change stage discriminating means for discriminating that shift change is effected from what speed stage to what speed stage during said shift change,
    load determining means for determining a magnitude of load exerted on a vehicle,
    residual oil quantity determining means for determining a quantity of residual hydraulic oil in each shift change clutch during the shift change, and
    controlling means for variably controlling a pattern of said electrical command to be issued to a pressure control valve in a required clutch during the shift change depending on outputs from said shift change stage discriminating means, said load determining means and said residual oil quantity determining means, said pattern varying as time elapses.

2. An apparatus for controlling a gear box as claimed in claim 1, wherein said load determining means includes vehicle speed detecting means for detecting a vehicle speed, throttle opening extent detecting means for detecting an extent of opening of a throttle and determining means for determining a loading state based on outputs from said vehicle speed detecting means and said throttle opening extent detecting means.

3. An apparatus for controlling a shift change unit as claimed in claim 2, wherein said vehicle speed detecting means detects said vehicle speed based on an output shaft speed of said gear box.

4. An apparatus for controlling a gear box as claimed in claim 2, wherein said determining means is such that said loading state is classified into three states, i.e., an ultimate state, an intermediate state and a low state corresponding to three states, i.e., a state of running of a vehicle on a flat ground, a state of running of the vehicle on a slope and a state of excavating operation, said classifying being achieved by comparing a value of inputted vehicle speed and the extent of opening of the throttle with preset values.

5. An apparatus for controlling a gear box as claimed in claim 1, wherein said residual oil quantity detecting means includes shift change time interval measuring means for measuring a time interval of speed changing from the time when the relevant shift change clutch is turned off till the time when it is turned on, with respect to each of said shift change clutches, vehicle speed detecting means for detecting a vehicle speed and determining means for determining a quantity of residual hydraulic oil in each shift change clutch during the shift change based on outputs from said shift change time interval measuring means and said vehicle speed detecting means.

6. An apparatus for controlling a gear box as claimed in claim 1, wherein said pattern adapted to vary as time elapses in response to said electrical command outputted from said controlling means to a shift change clutch to be brought in an engaged state includes a high pressure level part appearing immediately after starting of the shift change, a low pressure level part appearing subsequent to said high pressure level part and a pressure gradual increasing part appearing subsequent to said low pressure level part to gradually increase command pressure.

7. An apparatus for controlling a gear box as claimed in claim 6, wherein said controlling means carries out crossover control such that an electrical command to be issued to said shift change clutch to be brought in an engaged state partially overlapps an electrical command to be issued to a shift change clutch to be released from the engaged state.

8. An apparatus for controlling a gear box as claimed in claim 7, wherein said controlling means performs variable controlling for a pattern adapted to vary as time elapses in response to an electrical command by changing at least one of a level holding time or a level value of said high pressure level part in said electrical command to be issued to said shift change clutch to be brought in an engaged state, a level holding time or a level value of said low pressure level part, a rate of gradual increasing of said pressure gradual increasing part and a rate of gradual decreasing of said electrical command to be issued to said shift change clutch to be released from the engaged state.

9. An apparatus for controlling a gear box as claimed in claim 1, wherein said controlling means includes storing means for storing a plurality of patterns each adapted to vary as time elapses in response to said electrical command depending on outputs from said shift change stage discriminating means, said load determining means and said residual oil quantity determining means and wherein said controlling means performs variable controlling for a pattern adapted to vary as time elapses corresponding to outputs from said storing means, said shift change stage discriminating means, said load determining means and said residual oil quantity determining means.

10. An apparatus for controlling a gear box as claimed in claim 1, wherein said residual oil quantity determining means includes shift change time interval measuring means for measuring a time interval of shift change from the time when the relevant shift change clutch is turned off to the time when it is turned on with respect to each shift change clutch and wherein a pattern adapted to vary as time elapses in response to said electrical command outputted from said controlling means to a shift change clutch to be brought in an engaged state includes a high pressure level part appearing immediately after starting of the shift change, a low pressure level part appearing subsequent to said high pressure level part and a pressure gradual increasing part appearing subsequent to said low pressure level part to gradually increase command pressure, said controlling means variably controlling a level holding time for said high pressure level part depending on an output from said determining means.

* * * * *